United States Patent [19]

Kuroda et al.

[11] Patent Number: 4,591,909
[45] Date of Patent: May 27, 1986

[54] INTERFRAME CODING METHOD AND APPARATUS THEREFOR

[75] Inventors: Hideo Kuroda; Naoki Mukawa, both of Kanagawa, Japan

[73] Assignee: Nippon Telegraph & Telephone Public Corp., Japan

[21] Appl. No.: 602,405

[22] Filed: Apr. 20, 1984

[30] Foreign Application Priority Data

Apr. 20, 1983 [JP] Japan .................................. 58-68350
Apr. 20, 1983 [JP] Japan .................................. 58-68351

[51] Int. Cl.⁴ .......................................... H04N 7/137
[52] U.S. Cl. ...................................... 358/136; 358/13; 375/27
[58] Field of Search ................. 358/136, 133, 138, 13; 375/27

[56] References Cited

U.S. PATENT DOCUMENTS

| | | | |
|---|---|---|---|
| 3,184,542 | 5/1965 | Horsley | 358/136 |
| 3,423,526 | 1/1969 | Law | 358/136 |
| 4,371,895 | 2/1983 | Koga | 358/136 |
| 4,437,119 | 3/1984 | Matsumoto | 358/136 |

Primary Examiner—Howard W. Britton
Attorney, Agent, or Firm—Roberts, Spiecens & Cohen

[57] ABSTRACT

An interframe coding method performs predictive coding by dividing an input video signal into blocks each of which has a predetermined size, wherein a second memory for storing background data is arranged in addition to a first memory for storing coded picture data, and a block having a minimum prediction error among blocks read out from the first and second memories is detected as an optimal predictive block for every block of the input video signal, whereby predictive coding is performed by using the optimal predictive block. According to this method, after a moving element in the picture is displaced, the background area is monitored by using as predictive value data stored in the second memory. A prediction error becomes small, and coding efficiency is improved. In particular, motion compensated interframe coding is performed in addition to detection of the background area, thereby further improving the coding efficiency. The background image stored in the second memory is properly updated in accordance with the input video signal.

22 Claims, 36 Drawing Figures

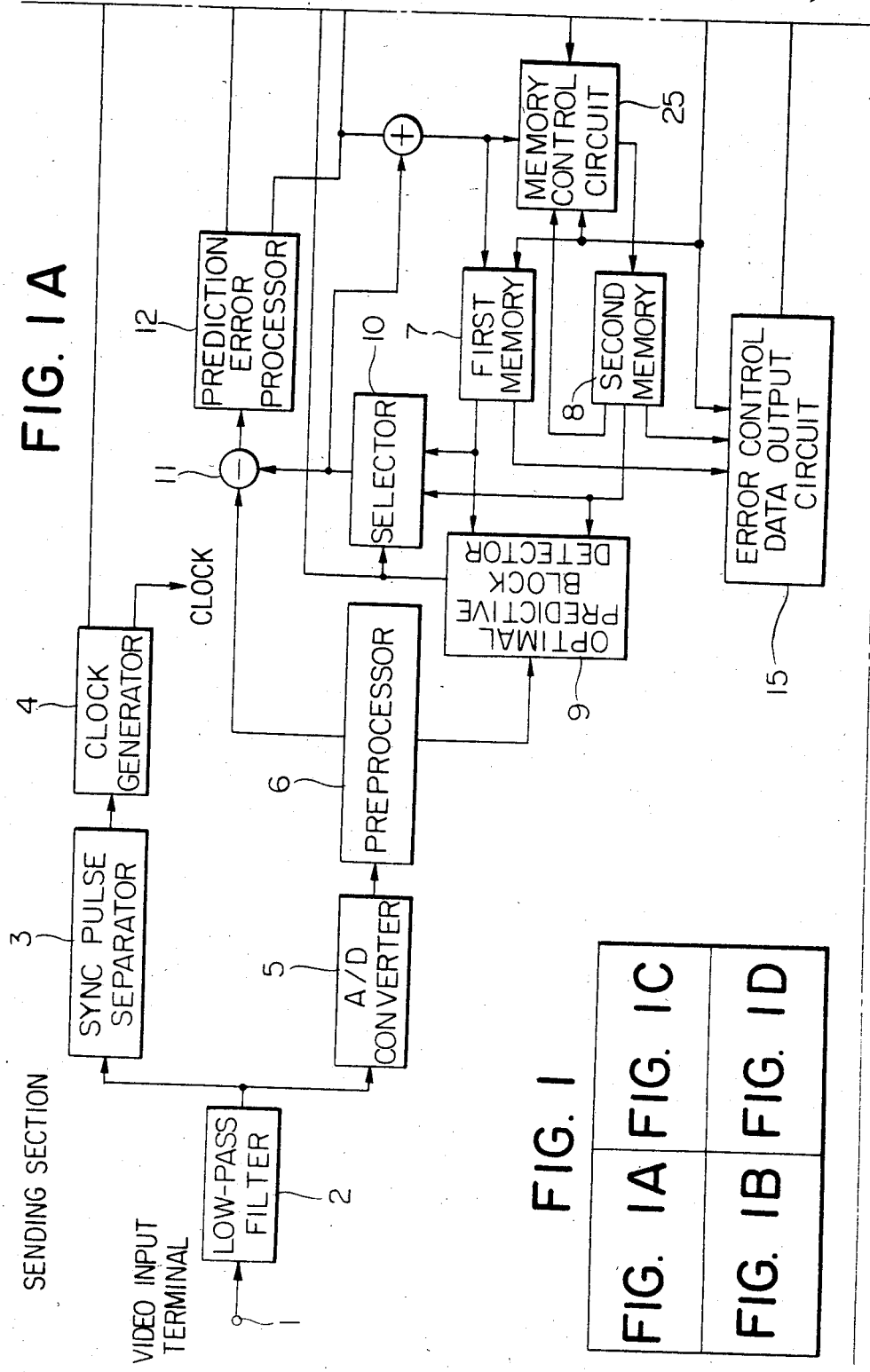

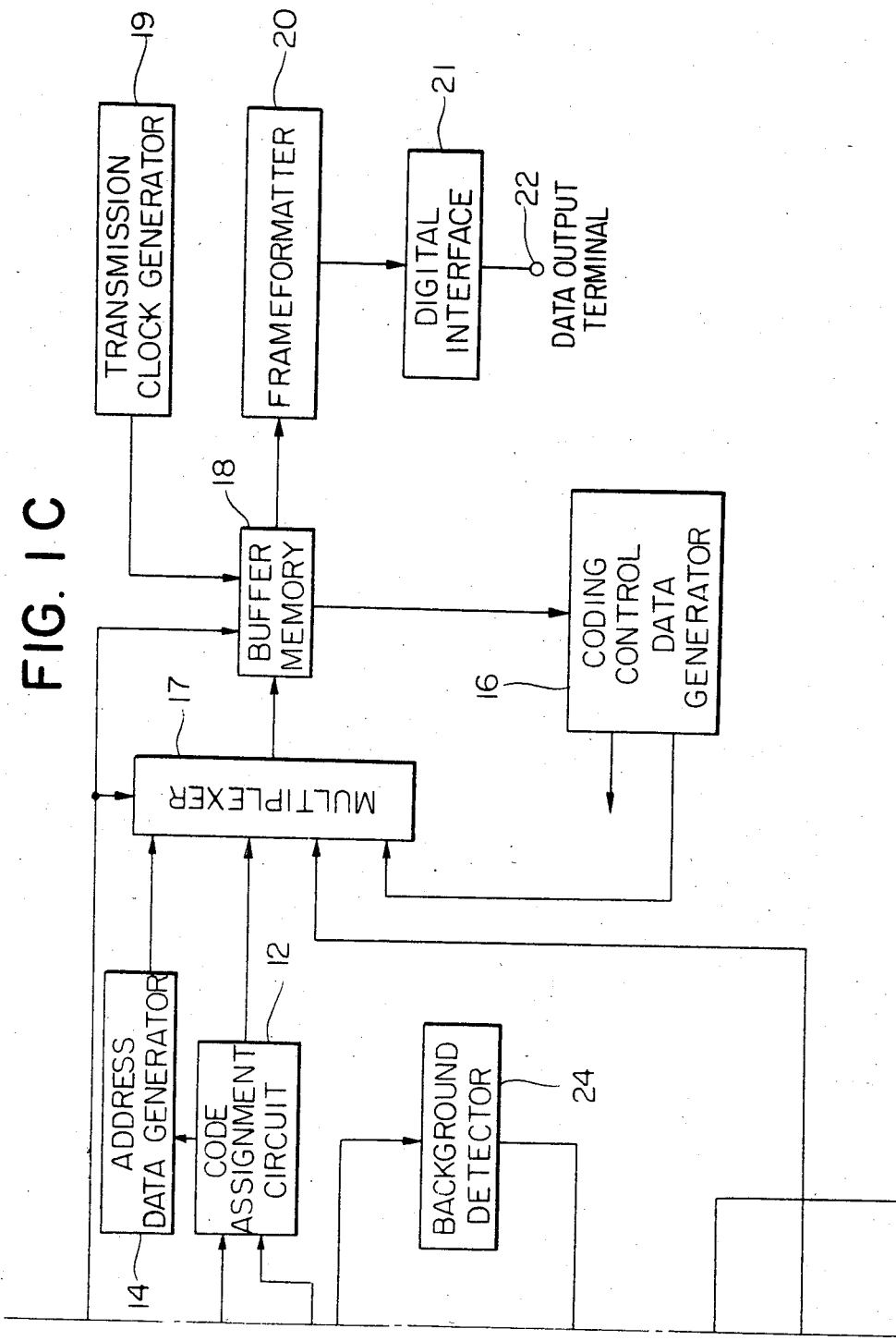

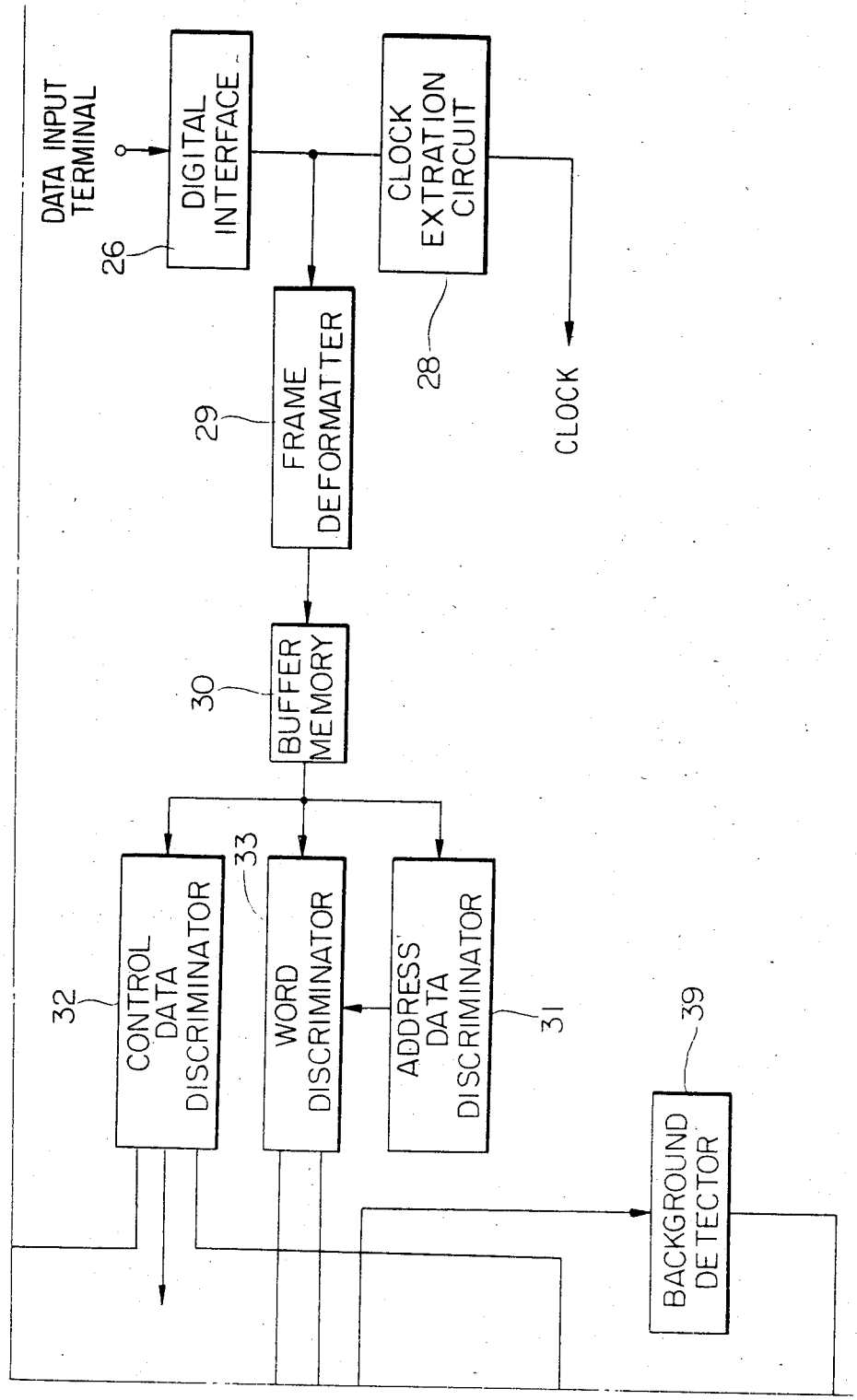

(a) $y_1^1\ y_1^2\ y_1^3\ y_1^4\ y_1^5\ y_1^6\ y_1^7\ y_2^1\ y_2^2\ y_2^3\ y_2^4$ ---------- $y_7^7\ y_8^1\ y_8^2\ y_8^3$ (b) $y_1^8\ y_1^9\ y_1^{10}\ y_1^{11}\ y_1^{12}\ y_1^{13}\ y_1^{14}\ y_2^8\ y_2^9\ y_2^{10}\ y_2^{11}$ ---------- $y_7^{14}\ y_8^8\ y_8^9\ y_8^{10}$ (c) $y_1^{15}\ y_1^{16}\ y_1^{17}\ y_1^{18}\ y_1^{19}\ y_1^{20}\ y_1^{21}\ y_2^{15}\ y_2^{16}\ y_2^{17}\ y_2^{18}$ ---------- $y_7^{21}\ y_8^{15}\ y_8^{16}\ y_8^{17}$ $d_2$ $\quad y_1^2\ y_1^3\ y_1^4\ y_1^5\ y_1^6\ y_1^7\ y_1^8\ y_2^1\ y_2^2\ y_2^3\ y_2^4$ ---------- $y_7^2\ y_7^3\ y_7^4\ y_7^5\ y_7^6\ y_7^7\ y_8^1\ y_8^2$ $d_3$ ------ $y_1^3\ y_1^4\ y_1^5\ y_1^6\ y_1^7\ y_1^8\ y_1^9\ y_2^1\ y_2^2\ y_2^3\ y_2^4\ y_2^5$ ---------- $y_7^3\ y_7^4\ y_7^5\ y_7^6\ y_7^7\ y_7^8\ y_7^9\ y_8^3$ $d_{14}$ $\quad y_1^{14}\ y_1^{15}\ y_1^{16}\ y_1^{17}\ y_1^{18}\ y_1^{19}\ y_1^{20}\ y_2^{14}\ y_2^{15}\ y_2^{16}$ ---------- $y_7^{14}\ y_7^{15}\ y_7^{16}\ y_7^{17}\ y_7^{18}\ y_7^{19}\ y_7^{20}\ y_8^{14}$

(x)   $x_1^1\ x_1^2\ x_1^3\ x_1^4\ x_1^5\ x_1^6\ x_1^7\ x_2^1\ x_2^2\ x_2^3\ \ldots\ x_7^6\ x_7^7$ (f2)  $y_2^2\ y_2^3\ y_2^4\ y_2^5\ y_2^6\ y_2^7\ y_2^8\ y_2^9\ y_3^2\ y_3^3\ y_3^4\ \ldots\ y_8^7\ y_8^8$ (f3)  $y_2^3\ y_2^4\ y_2^5\ y_2^6\ y_2^7\ y_2^8\ y_2^9\ y_3^3\ y_3^4\ y_3^5\ \ldots\ y_8^8\ y_8^9$ ---(f14) $y_2^{14}\ y_2^{15}\ y_2^{16}\ y_2^{17}\ y_2^{18}\ y_2^{19}\ y_2^{20}\ y_3^{14}\ y_3^{15}\ y_3^{16}\ \ldots\ y_8^{19}\ y_8^{20}$ (e2)  $y_3^2\ y_3^3\ y_3^4\ y_3^5\ y_3^6\ y_3^7\ y_3^8\ y_4^2\ y_4^3\ y_4^4\ \ldots\ y_9^7\ y_9^8$ (e3)  $y_3^3\ y_3^4\ y_3^5\ y_3^6\ y_3^7\ y_3^8\ y_3^9\ y_4^3\ y_4^4\ y_4^5\ \ldots\ y_9^8\ y_9^9$ ---(e14) $y_3^{14}\ y_3^{15}\ y_3^{16}\ y_3^{17}\ y_3^{18}\ y_3^{19}\ y_3^{20}\ y_4^{14}\ y_4^{15}\ y_4^{16}\ \ldots\ y_9^{19}\ y_9^{20}$ (gℓ)  | PREVIOUS BLOCK DATA | $g_\ell = \Sigma T(x_n^m - y_{n+2}^{m-1+\ell})$ |

| h | | |
|---|---|---|
| | | $9_2\,9_3\,9_4\,9_5\,9_6\,9_7\,9_8\,9_9\,9_{10}\,9_{11}\,9_{12}\,9_{13}\,9_{14}\,9_{14}\,9_{14}\,9_{14}\,9_{14}$ |
| PRIORITY SELECTION DATA | | 0 0 0 0 0 0 0 1 1 1 1 1 1 1 1 1 1 |
| COUNTER | | 1 2 3 4 5 6 7 8 9 10 11 12 13 14 15 16 17 |
| SELECTOR A OUTPUT | | $9_2\,9_2\,9_4\,9_5\,9_5\,9_7\,9_8\,9_9\,9_{10}\,9_{10}\,9_{10}\,9_{11}\,9_{10}\,9_{10}\,9_{10}\,9_{10}\,9_{10}$ |
| SELECTOR B OUTPUT | | 1 1 3 4 4 6 7 8 9 9 9 9 9 9 9 9 9 |
| F/F A | | 8 $9_2\,9_2\,9_4\,9_5\,9_5\,9_7\,9_8\,9_9\,9_{10}\,9_{10}\,9_{10}\,9_{10}\,9_{10}\,9_{10}\,9_{10}\,9_{10}$ |
| F/F B | | – 1 1 3 4 4 6 7 8 9 9 9 9 9 9 9 9 |
| F/F C (iℓ) | PREVIOUS BLOCK DATA | $9_{10}$ |
| F/F D (jℓ) | PREVIOUS BLOCK DATA | 9 |
| (i) | | i2 i3 i4 i5 i6 ------ i4 i4 --- |
| (j) | | j2 j3 j4 j5 j6 ------ j14 j14 --- |

BACKGROUND DETECTOR 24

BACKGROUND DETECTOR 24

BACKGROUND DETECTOR 24

INTERFRAME CODING METHOD AND APPARATUS THEREFOR

BACKGROUND OF THE INVENTION

I. Field of the Invention

The present invention relates to an interframe coding method and an apparatus therefor, wherein highly precise prediction is performed for moving areas of a picture to optimally code a video signal thereof with high efficiency.

II. Background of the Invention

Interframe coding is proposed as one of conventional coding schemes to code a video signal with high efficiency by using interframe correlation. In interframe coding, a pel value of a previous frame to the present frame is used as a predictor of an input video signal. This coding scheme is based on an assumption that a displacement in a picture is small. For example, interframe coding is mainly used for television conferences wherein a displacement of moving objects is small. For this reason, when an object is greatly displaced, proper prediction cannot be performed, thereby degrading the coding efficiency.

A motion compensated interframe coding method is proposed in Japanese Patent Disclosure No. 56-93492 so as to improve prediction precision even when an object is greatly displaced. According to this method, an input signal of a given frame is divided into blocks each of which consists of 7 lines×7 pels. For each block of the given frame, a block of the previous frame which is located in the same position as the block of the given frame, and blocks displaced by ±m vertical lines (e.g., m=1 to 6) and ±n horizontal pels (n=1 to 6) from this block of the previous frame are set. An optimal block which minimizes a prediction error is selected from these blocks of the previous frame. Vector data representing vertical and horizontal displacements between the block of the current frame and the selected optimal block of the previous frame is supplied to a receiving end. Predictive image coding of the current frame is performed using as a predictive value the value of pels in the selected block of the previous frame.

However, according to the conventional method of this type, when a member participating in a conference is in motion, motion compensation is performed for this moving person, but cannot be applied to a background area such as a wall monitored on the screen. Therefore, a large amount of data is generated from the background area and thereby degrading coding efficiency and resulting in inconvenience.

SUMMARY OF THE INVENTION

It is a principal object of the present invention to overcome the conventional drawbacks described above and to provide an interframe coding method and an apparatus therefor, wherein background data are separately stored so as to efficiently, highly precisely perform predictive coding for a background area when moving elements in a picture, such as persons, are displaced.

It is another object of the present invention to provide an interframe coding method and an apparatus therefor, wherein highly precise predictive image coding is performed for an entire picture by combining background data storage and motion compensated interframe coding.

According to the interframe coding method for performing predictive coding by dividing an input video signal into blocks each of which has a predetermined size, a second memory means for storing background data is arranged in addition to a first memory means for storing coded picture data. A block from among the blocks read out from the first and second memory means which has a minimum prediction error is detected as an optimal predictive block for each block of the input video signal divided into blocks. Predictive coding is then performed in accordance with the optimal predictive block.

According to this method, since background data stored in the second memory means is used as the predictive value for the background area in a picture immediately after moving areas in the input picture are displaced, prediction errors become small and coding efficiency can be improved.

According to an aspect of the present invention, the optimal predictive block is detected such that block signals at identical locations of the present and previous frames which are read out from the first and second memory means are used as prediction signals, and prediction errors of the block signals are detected for every block of the input video signal divided into blocks so as to access whichever one of the first and second memory means has a smaller prediction error.

According to another aspect of the present invention, the optimal predictive block is detected such that block signals read out from the first memory means and corresponding to the locations of the same and neighboring blocks of the previous frame as those of the present frame, and a block signal read out from the second memory means and corresponding to the location of the same block of the previous frame as that of the present frame are used as prediction signals for every block of the present input video signal divided into blocks, that prediction errors of these prediction signals are calculated, and that a block having the minimum prediction error is detected as the optimal predictive block. When motion compensation is performed when elements in a picture are greatly displaced, prediction errors must be measured for the blocks stored in the first memory, respectively. According to this aspect, only a small number of means and operations is added to conventional motion compensated interframe coding, and the coding efficiency is greatly improved thereby. For example, assume a case wherein motion compensation is performed by measuring prediction errors for 169 blocks obtained by displacing a block of the previous frame stored in the first memory and corresponding to the location of the same block of the present frame within the ranges of ±6 vertical and horizontal pels. In this case, in order to improve prediction precision, only one means for measuring the prediction errors of the background area and another second memory means for storing background data need be added to means for measuring the prediction errors of 169 blocks.

According to an aspect for detecting a background area in interframe coding of the present invention, it is detected whether or not the prediction error of each sample of the blocks constituting the input video signal is less than a predetermined threshold value. When the prediction error is less than the predetermined threshold value, the corresponding sample is detected as a background area.

According to another aspect for detecting the background area in interframe coding, it is detected whether or not the prediction error of each sample of the blocks constituting the input video signal is less than a predetermined threshold value. When the prediction errors of all the samples of a block are less than the predetermined threshold, this block can be regarded as a background area.

According to still another aspect for detecting the background area in interframe coding, it is detected whether or not the prediction error of each sample of the blocks constituting the input video signal is less than a predetermined threshold value. When the number of samples of a block whose prediction errors are smaller than the predetermined threshold, the block is detected as a background area.

According to still another aspect for detecting the background area in interframe coding, it is detected whether or not the prediction error of each sample of the blocks constituting the video signal is less than a predetermined threshold value continuously for a plurality of frames. If so, the smaple or block is detected to be a backgound area.

When a given sample or block is detected as a background area, the background data stored in the second memory is updated in accordance with the input video signal. Data updating can be periodically performed.

An interframe coding apparatus for practicing the method described above has: preprocessing means for rearranging a video signal into block signals and generating the block signals; first memory means for storing coded picture data; second memory means for storing background data; optimal predictive block detecting means for receiving outputs read out from the first and second memory means and detecting an optimal predictive block having a minimum prediction error with respect to each of the block signals; selecting means for receiving the outputs read out from the first and second memory means and selecting the block signal detected by the optimal predictive block detecting means; means for generating a prediction error signal in accordance with an output from the preprocessing means and an output from the selecting means; background detecting means for receiving the prediction error signal and detecting a background area; and memory controlling means for updating a content of the second memory means which corresponds to the background area detected by the background detecting means.

The optimal predictive block detecting means according to an aspect of the present invention receives the outputs read out from the first and second memory means, rearranges the outputs into block signals respectively corresponding to the blocks of the input video signal to constitute predictive values, and detects as the optimal predictive block one of the blocks (read out from the first and second memory means) which has a smaller prediction error for each block signal supplied from the preprocessing means.

The optimal predictive block detecting means according to another aspect of the present invention receives the outputs read out from the first and second memory means, calculates prediction errors by using as prediction signals block signals read out from the first memory means and corresponding to the locations of the same and neighboring blocks of the previous frame as those of the present frame, and a block signal read out from the second memory means and corresponding to the location of the same block of the previous frame as that of the present frame, for every block of the present input video signal divided into blocks, and detecting a block having a minimum prediction error as the optimal predictive block.

Other objects, the features and advantages of the invention will be apparent from the following detailed description when read with the accompanying drawings which show, by way of example and not limitation, apparatus for realizing the presently preferred embodiment of the invention.

BRIEF DESCRIPTION OF THE DRAWINGS:

FIGS. 7A and 7B respectively show matrices of pels for explaining the operation of the serial-parallel converter shown in FIG. 6;

FIG. 8 is a timing chart of signals in the serial-parallel converter shown in FIG. 6;

FIG. 9 is a block diagram showing a detailed arrangement of a prediction error accumulator (ACM) shown in FIG. 5;

FIG. 10 is a timing chart of signals in the prediction error accumulator shown in FIG. 5;

FIG. 12 show signal strings in the vertical optimal block detector;

PREFERRED EMBODIMENT OF THE INVENTION

Figure 1B:
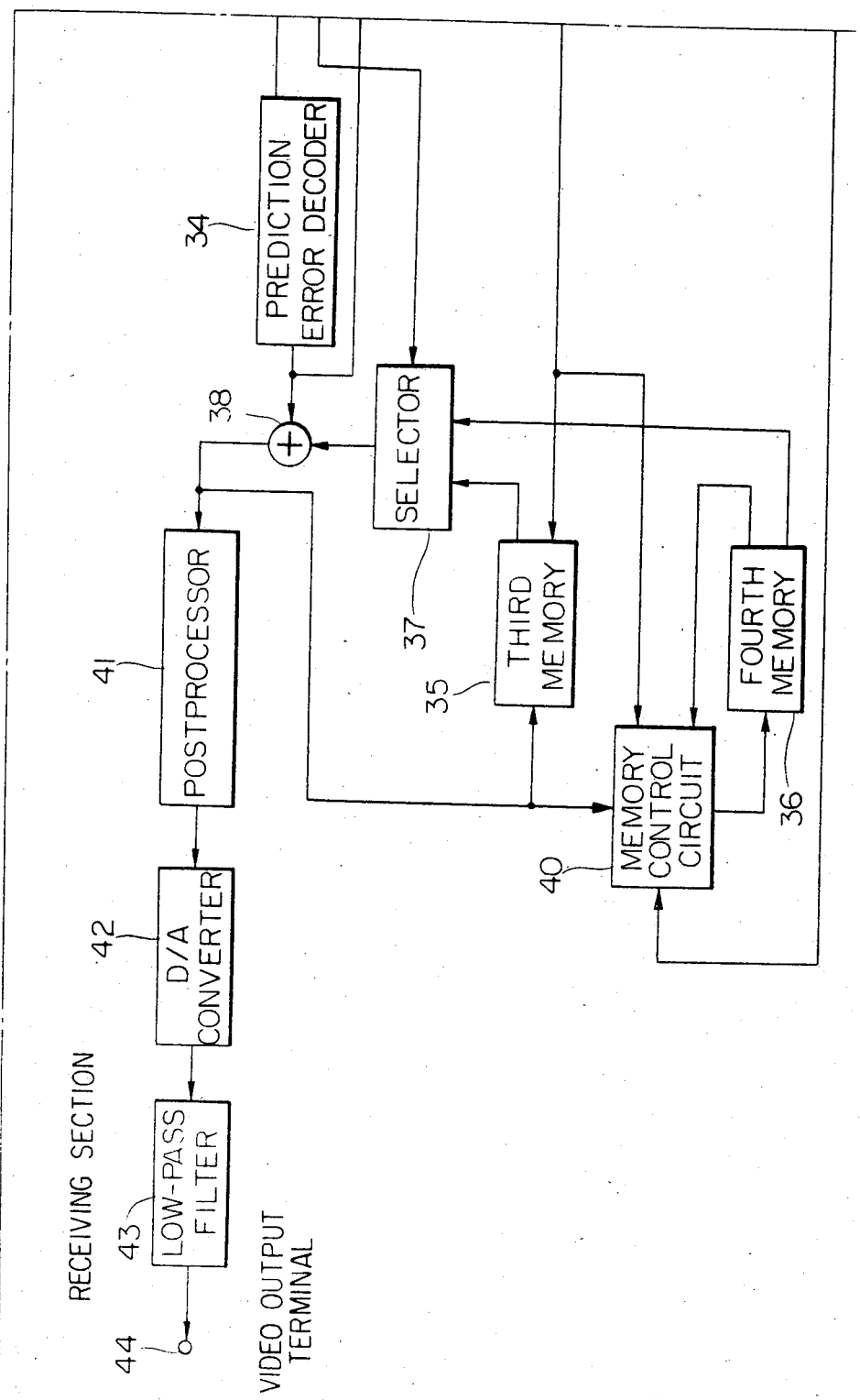
FIG. 1, consisting of FIGS. 1A, 1B, 1C and D, is a block diagram showing an interframe coding apparatus according to an embodiment of the present invention.

FIG. 1 is a block diagram showing an interframe coding apparatus according to an embodiment of the present invention.

In the sending section, reference numeral 1 denotes a video input terminal; 3, a sync pulse separator for separating a sync pulse from an output filtered through a low-pass filter 2; and 4, a clock generator for generating various clocks which are phase-locked with the output from the sync pulse separator 3 so as to supply necessary clocks to the component circuits. Reference numeral 5 denotes an A/D converter for converting to a digital signal an analog video signal as an output generated from the low-pass filter 2; 6, a preprocessor for dividing an output of the A/D converter 5 into blocks each having a predetermined size; 7, a first memory for storing coded/decoded picture data; 8, a second memory for storing background data; 9, an optimal predictive block detector for detecting a block with a minimum prediction error, among the blocks read out from the first and second memories 7 and 8; 10, a selector for selecting a block signal of one of the blocks read out from the first and second memories 7 and 8, in accordance with an output from the optimal predictive block detector 9; 11, a subtracter for subtracting the output of the selector 10 from the output as the predictive value or estimate of the preprocessor 6 so as to generate a prediction error; 12, a prediction error processor for quantizing the output of the subtracter 11 and generating a representative quantized value; 13, a code assignment circuit for assigning a predetermined code to the output of the prediction error processor 12 and the optimal predictive block detector 9; 14, an address data generator for generating address data (i.e., screen position) in response to the output from the code assignment circuit 13; 15, an error control data output circuit for generating data for matching the contents of the first and second memories 7 and 8 with the corresponding memories at the receiving section; 16, a coding control data generator for generating data which represents a coding control state; 17, a multiplexer for multiplexing outputs from the code assignment circuit 13, the address data generator 14, the error control data output circuit 15 and the coding control data generator 18 in a time division manner in response to the output from the clock generator 4; 18, a buffer memory for temporarily storing an output generated from the multiplexer 17 and for reading out the data in response to an output clock generated from a transmission clock generator 19; 20, a frame formatter for formating the output of the buffer memory 18 in a transmission frame; and 21, a digital interface for converting the output of the frame formatter 20 to an AMI code and sending it onto a digital transmission line through a data output terminal 22. Reference numeral 23 denotes an adder for adding the outputs generated from the prediction error processor 12 and the selector 10 and generating a local decoded signal; 24, a background detector for detecting a background area in a picture in accordance with the output generated from the prediction error processor 12; and 25, a memory control circuit for receiving the outputs from the adder 23 and the second memory 8 and for updating a pel value in an area specified by the output generated from the background detector 24.

In the receiving section, reference numeral 26 denotes a data input terminal; 27, a digital interface for receiving the transmission line code (i.e., AMI code) and converting it to a decodable signal (e.g., unipolar signal); 28, a clock extraction circuit for receiving the output generated from the digital interface 27 to extract the transmission line clock and other necessary clock signals; 29, a frame deformatter for extracting the transmission frame from the output generated from the digital interface 27; 30, a buffer memory for temporarily storing the output generated from the frame deformatter 29 and for reading out data at a decoding rate; 31, an address data discriminator for discriminating address data from the output read out from the buffer memory 30 and for supplying the address data to a word discriminator 33; and 32, a control data discriminator for discriminating error control data from the output read out from the buffer memory 30 to supply it to a third memory 35, a memory control circuit 40, and the first memory 7 of the sending section, the memory control circuit 25, and the error control data output circuit 15 of the sending section. The control data discriminator 32 also discriminates control data for decoding and supplying it to the associated circuits. Reference numeral 33 denotes a word discriminator for discriminating optimal predictive block data from the output read out from the buffer memory 30 and supplying it to a selector 37. The word discriminator 33 also discriminates a word which represents a prediction error and supplies the word to the prediction error decoder 34, so this detector 34 decodes the prediction error which is supplied from the word discriminator 33. The third memory 35 stores the decoded picture data. Reference numeral 36 denotes a fourth memory for storing background data; 37, a selector for selecting a block signal among the outputs read out from the third and fourth memories 35 and 36 in response to the output generated from the word discriminator 33; 38, an adder for adding the output of the selector 37 and the output of the prediction error decoder 34 so as to generate a decoded signal; 39, a background detector for detecting a background area in response to the output generated from the prediction error decoder 34; 40, a memory control circuit for receiving the outputs from the fourth memory 36 and the adder 38 and for updating a pel value of an area specified by the output generated from the background detector 39; 41, a postprocessor for receiving an output of the adder 38 and performing signal rearrangement and noise reduction; 42, a D/A converter for converting to an analog signal 43, a low-pass filter for limiting the frequency band of the output generated from the D/A converter 42 and generating the filtered signal at a video output terminal 44.

The operation of the apparatus shown in FIG. 1 will now be described. A video signal (i.e., NTSC signal) supplied to the video input terminal 1 is filtered by the low-pass filter 2 which generates a 4.2-MHz signal. This 4.2-MHz signal is sampled by the A/D converter 5 at a frequency $4f_{SC}$ (where fSC is the subcarrier frequency). For example, each sampled digital signal consists of eight bits. This digital signal is supplied to the preprocessor 6.

Figure 2:
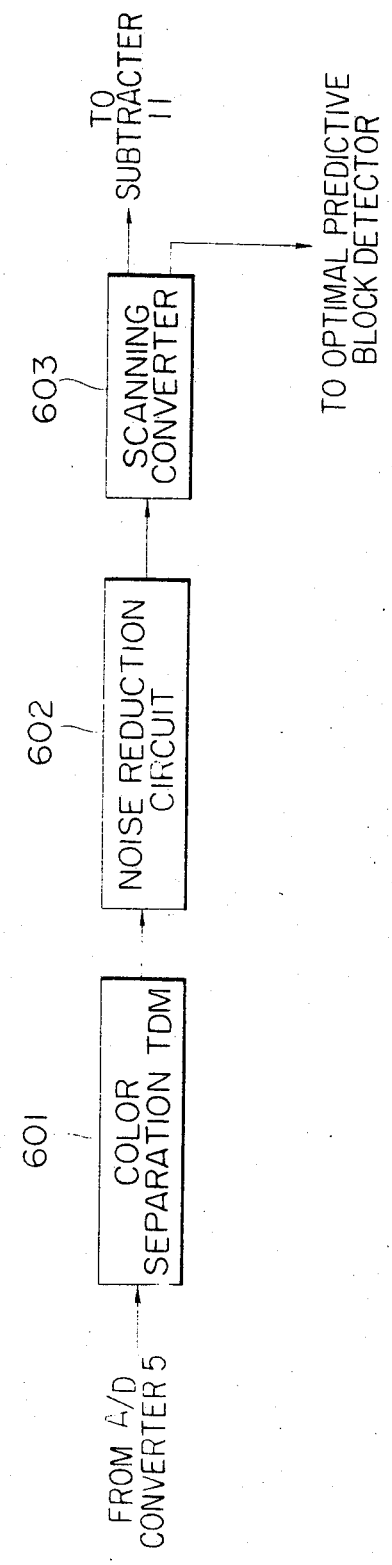
FIG. 2 is a block diagram showing the detailed arrangement of a preprocessor shown in FIG. 1.

FIG. 2 shows the detailed arrangement of the preprocessor 6. Reference numeral 601 denotes a color separation TDM (time-division multiplexer); 602, a noise reduction circuit; and 603, a scanning converter. The present invention is directed to a composite signal such as an NTSC or PAL signal which consists of a luminance signal and a color or chrominance signal. The subcarrier modulated with the color signal is superposed on the high-frequency component of the luminance signal. In addition, the subcarrier has 180°-shifted phase for every frame. Therefore, even if an interframe difference is coded, highly efficient coding cannot be performed. The color separation TDM 601 converts the signal format so as to allow highly efficient coding. The color separation TDM 601 separates the input video signal into the luminance signal Y and two color signals C1 and C2 (e.g., I and Q signals). A signal obtained by compressing the color signals along the time base is time-division multiplexed during the flyback period of the luminance signal.

Figure 3A:
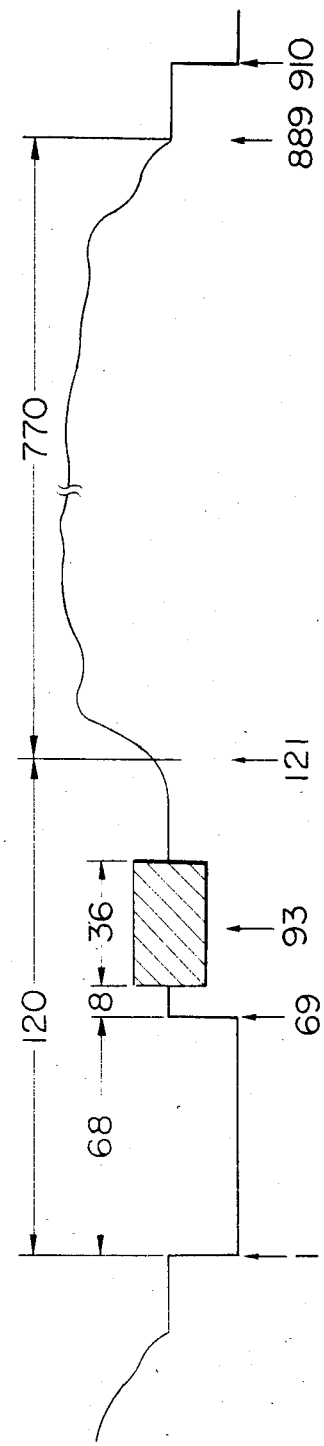
FIGS. 3A and 3B show the relationship between the format of a TDM signal and sampling points.
Figure 3B:
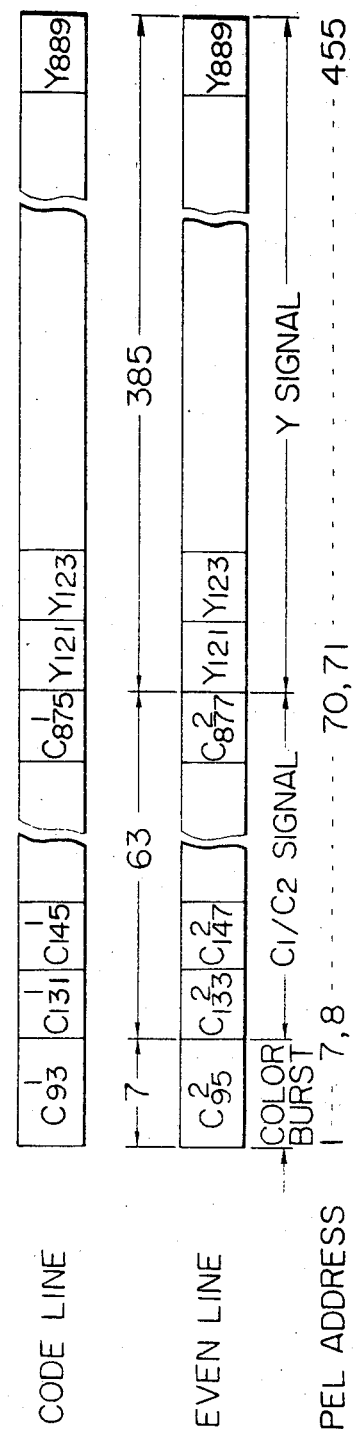

FIGS. 3A and 3B show the relationship between the format of the TDM signal as the output of the color separation TDM 601 and the sampling point, in which FIG. 3A shows an NTSC signal of one horizontal scanning line, and FIG. 3B shows the TDM color TV signal format. 455 samples are obtained for one line: an amplitude of a color burst is transmitted by the first seven samples; the color signals C1 and C2 are transmitted by the next 63 samples; and the luminance signal Y is transmitted by the last 385 samples. It should be noted that the sampled values of an odd line of color signals C1 and C2 are actually transmitted as those of a pair of odd and even lines. The odd-line samples are transmitted for the color signal C1, and the even-line samples are transmitted for the color signal C2.

The noise reduction circuit 602 comprises a conventional noise reducer which suppresses a small interframe difference as noise.

The scanning converter 603 comprises a memory for storing data of a plurality of lines.

Figure 4A:
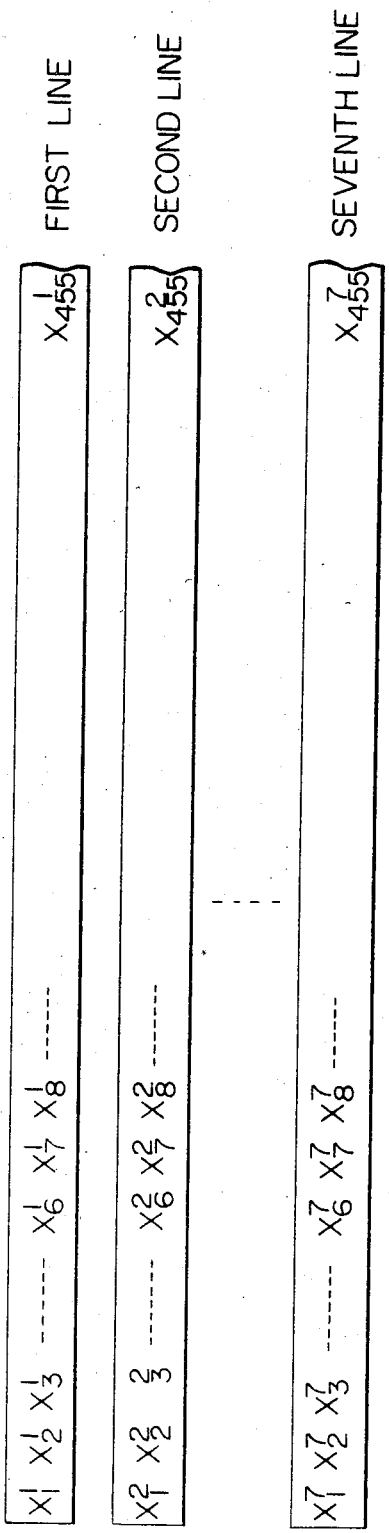
FIGS. 4A and 4B show signal formats of the input-/output signals of a scanning converter.
Figure 4B:
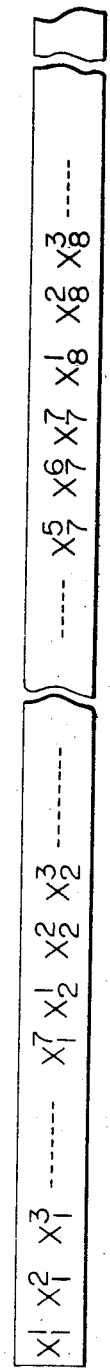

FIGS. 4A and 4B show formats of the input and output signals with respect to the scanning converter 603, in which FIG. 4A shows outputs generated from the noise reduction circuit and FIG. 4B is the output from the scanning converter. FIGS. 4A and 4B show a case wherein 7-line scanning conversion is performed. The outputs from the noise reduction circuit 602 are sequentially written in an order from the first line memory to the seventh line memory. The stored data are read out in an order of samples $X_1^1, X_1^2, \ldots, X_1^7, X_2^1, X_2^2, \ldots, X_2^7, X_3^1, \ldots$ which are vertically aligned. It should be noted that $X_n^m$ indicates a sample having a line number m and a sample number n. This scanning conversion is performed by 14-line memory in the following manner. During a 7-line period while sampled data are written in the first 7-line memory, data are read out from the second 7-line memory. During the period while data are written in the second 7-line memory, the data are read out from the first 7-line memory. The scanning-converted data are delayed by a predetermined interval, and the delayed data are supplied to the optimal predictive block detector 9 and the subtracter 11.

The optimal predictive block detector 9 receives the one-block data from the preprocessor 6 and detects one of the blocks read out from the first and second memories 7 and 8 which has a minimum prediction error for the one-block data (i.e., data of 7 lines × 7 samples).

Figure 5:
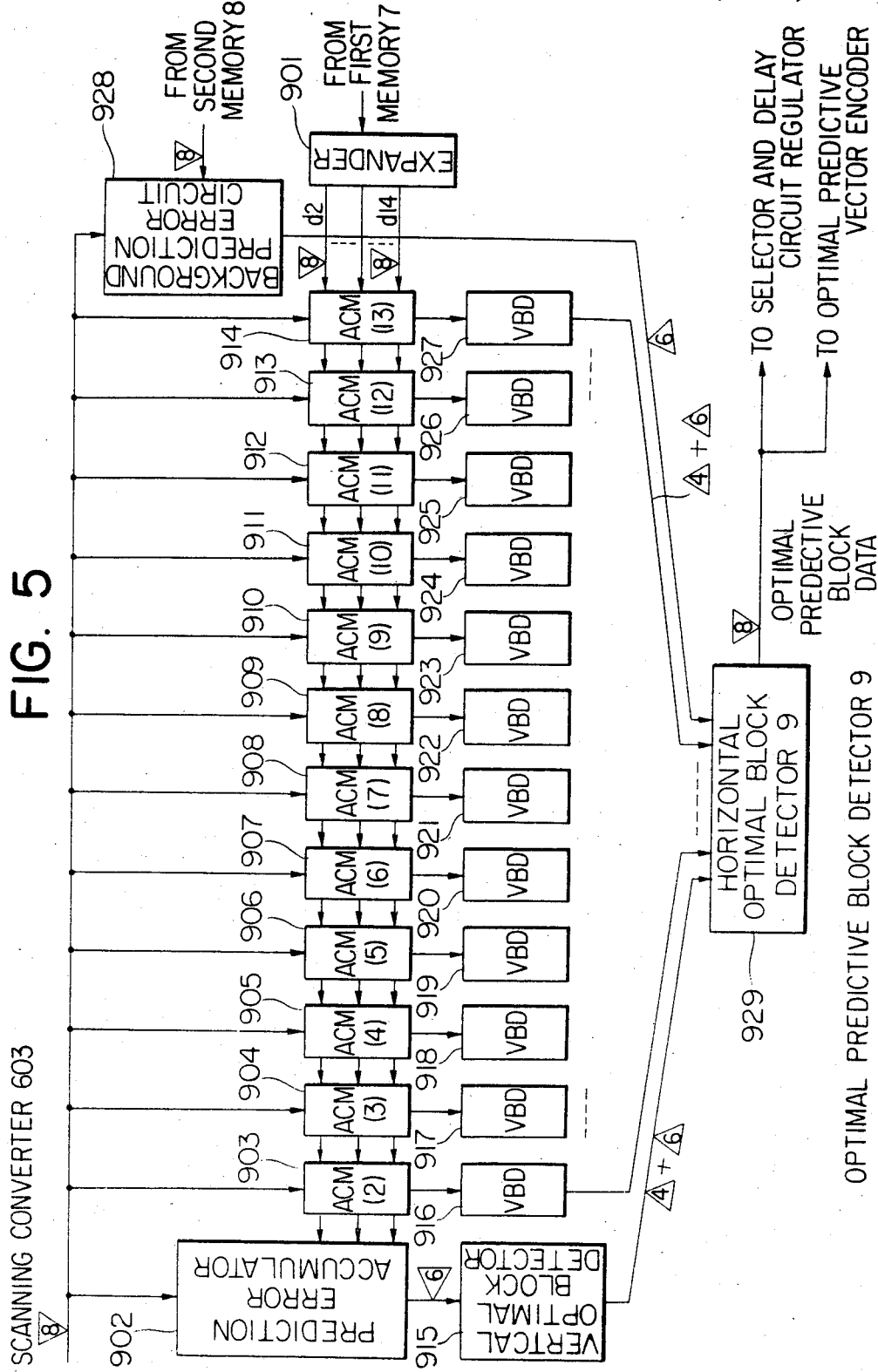
FIG. 5 is a block diagram showing a detailed arrangement of an optimal predictive block detector shown in FIG. 1.

FIG. 5 shows the detailed arrangement of the optimal predictive block detector 9. Reference numeral 901 denotes a serial-parallel converter; 902 to 914, prediction error accumulators (ACM), respectively; 915 to 927, vertical optimal block detectors (VBD), respectively; 928, a background prediction error accumulator; and 929, a horizontal optimal block detector. It should be noted that a numeral in a triangular mark indicates the number of bits.

Figure 6:
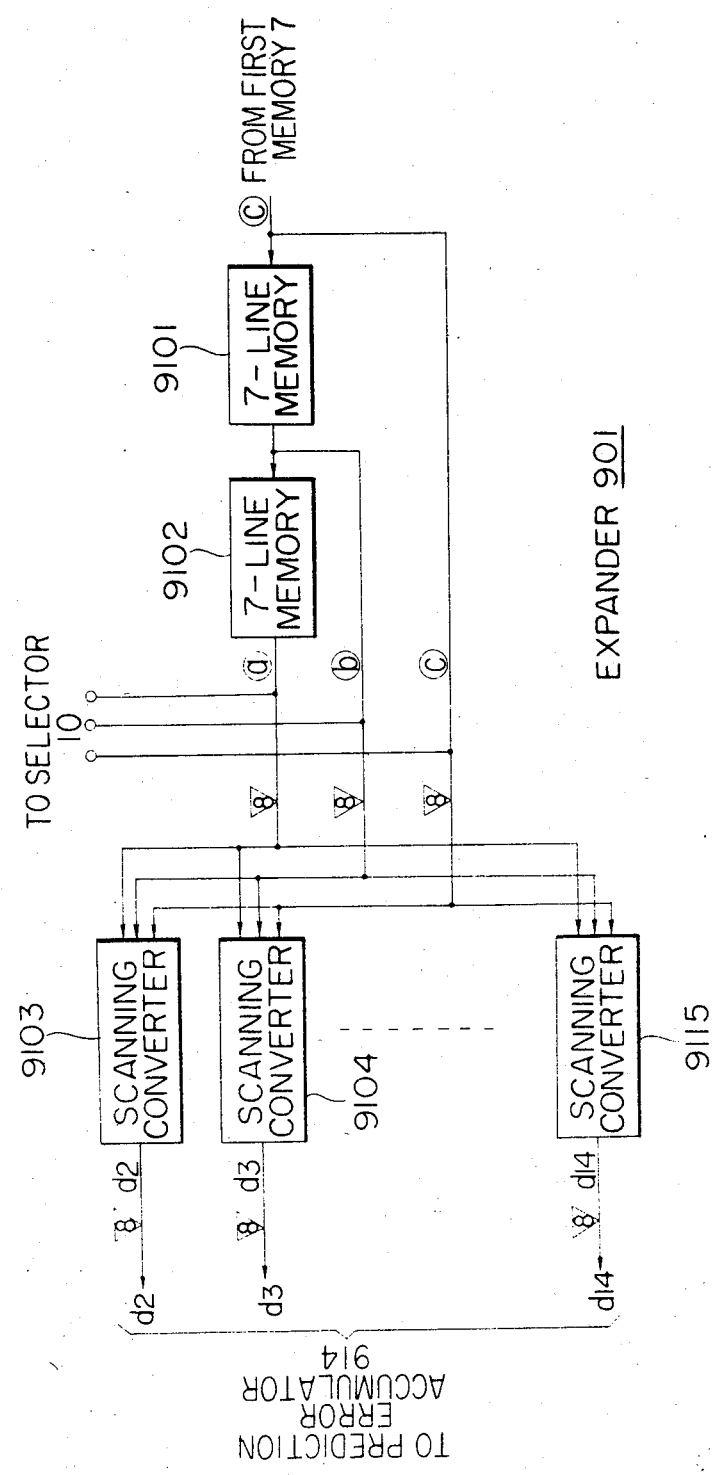
FIG. 6 is a block diagram showing the detailed arrangement of a serial-parallel converter shown in FIG. 5.

FIG. 6 shows the detailed arrangement of the serial-parallel converter 901 shown in FIG. 5. The serial-parallel converter 901 comprises 7-line memories 9101 and 9102 and scanning converters 9103 to 9115.

Figures 7A, 7B:
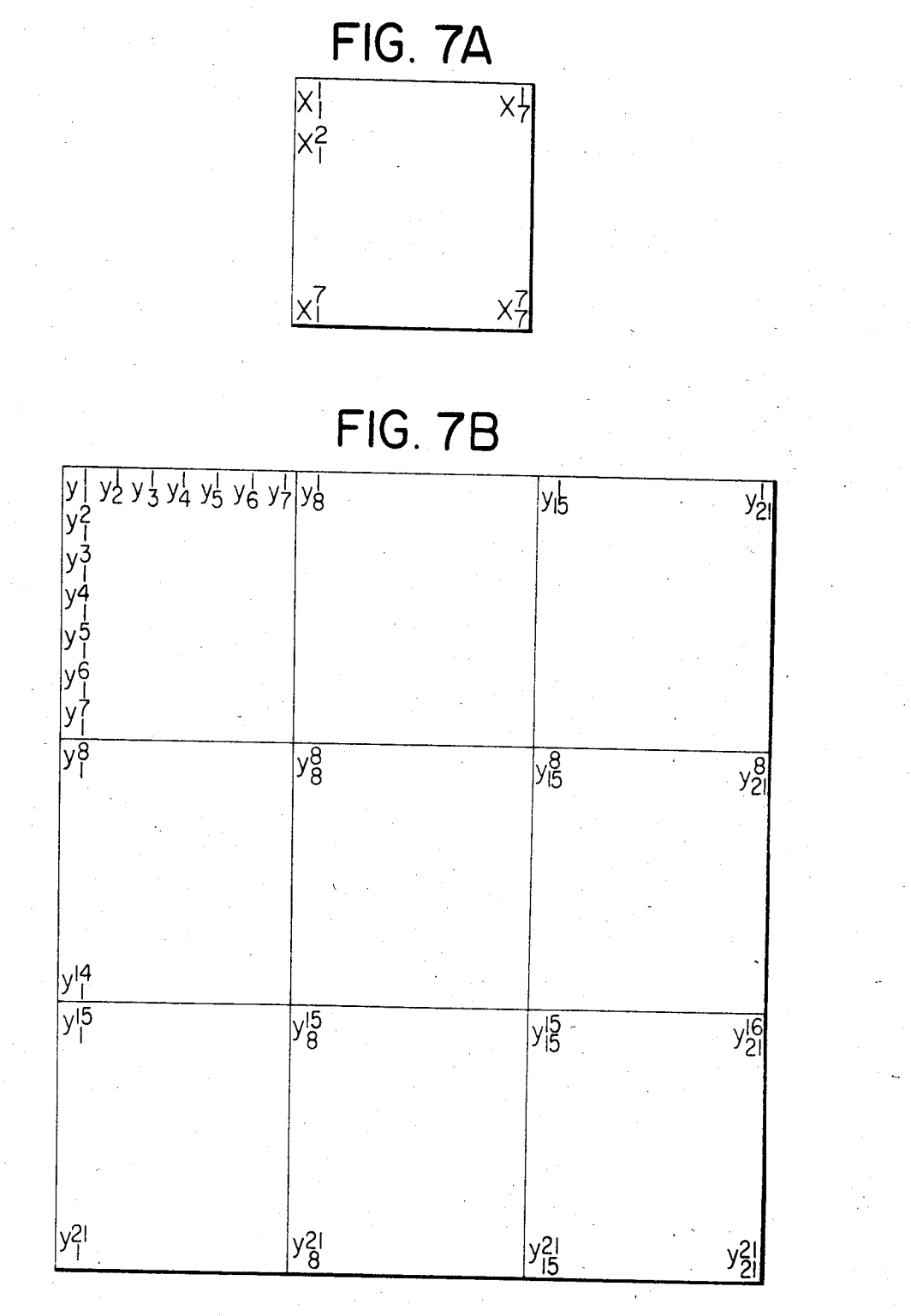

FIGS. 7A and 7B show matrices of pels in order to explain the operation of the serial-parallel converter 901, in which FIG. 7A shows the pel matrix of the present-frame signal and the background signal, and FIG. 7B shows the pel matrix of the signal of the previous frame. It should be noted that $x_n^m$ and $y_n^m$ respectively indicate pels each of which has a line number m and a pel number n in the block.

Referring again to FIG. 5, the signal is supplied from the first memory 7 to the serial-parallel converter 901. This signal is supplied to the scanning converters 9103 to 9115 as a signal ⓐ generated through the 7-line memories 9101 and 9102 of FIG. 6, a signal ⓑ generated through the 7-line memory 9101, and a signal ⓒ bypassed over the 7-line memories 9101 and 9102. 8-bit signal strings d2 to d14 are generated from the scanning converters 9103 to 9115, respectively. These signal strings are supplied to the prediction error accumulator 914.

FIG. 8 shows a timing chart of signals used in the serial-parallel converter 901. Reference symbols ⓐ to ⓒ denote signals commonly supplied to the scanning converters 9103 to 9115; d2 to d14, signals converted by the scanning converters 9103 to 9115, respectively.

Referring to FIG. 5, for a 49-time slot 8-bit signal supplied from the scanning converter 603 in the preprocessor 6 to the prediction error accumulators 902 to 914, the accumulators 902 to 914 accumulate errors between the signals obtained by displacing the pel by ±6 vertical and horizontal pels and the 49-time slot 8-bit signal, so that each accumulator produces 13 values. The resultant outputs are converted to 13-time slot time-serial data which are supplied to the vertical optimal block detectors 915 to 927.

Figure 9:
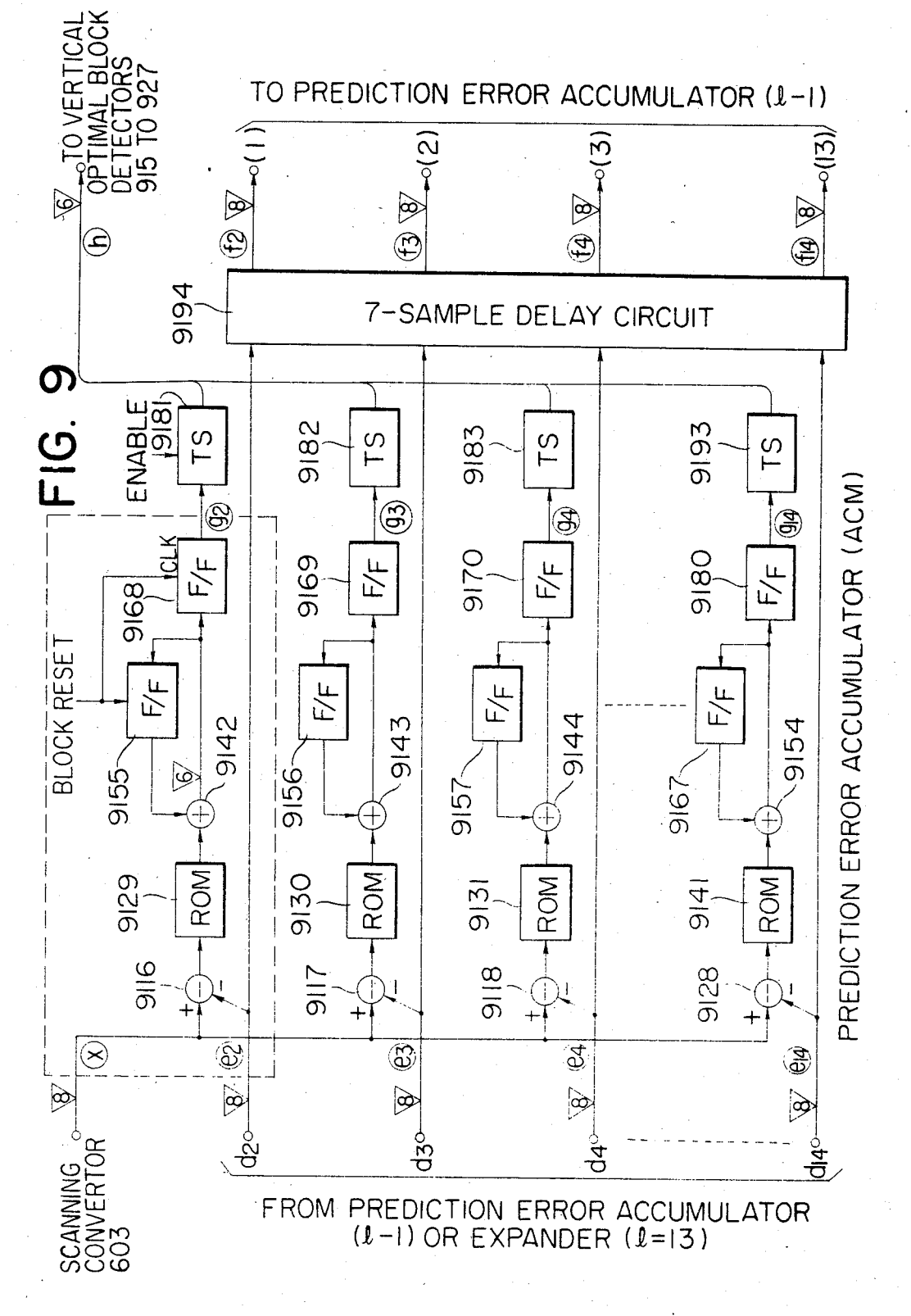

FIG. 9 shows the detailed arrangement of one (lth) of the prediction error accumulators 902 to 914. In the lth prediction error accumulator, reference numeral 9116 to 9128 denote subtracters, respectively; 9129 to 9141, ROMs, respectively; 9142 to 9154, adders, respectively;

9155 to 9180, flip-flops, respectively; 9181 to 9193, tristate flip-flops, respectively; and 9194, a 7-sample delay circuit.

A signal x is supplied from the scanning converter 603 to the subtracters 9116 to 9128. Each subtracter subtracts the output of the prediction error accumulator or serial-parallel converter from the signal x. The ROMs 9129 to 9141 produce data of logic "1", respectively, when the absolute values of the outputs from the subtracters 9116 to 9128 exceed a predetermined threshold value. However, each ROM produces data of logic "0" when the absolute value of the output from the corresponding subtracter is smaller than the predetermined threshold value. The adders 9142 to 9154 and the corresponding flip-flops 9155 to 9167 constitute an accumulator which accumulates the outputs from the ROMs 9129 to 9141 during the one-block period. The accumulated results of each block are stored in the flip-flops 9168 to 9180 and are time-division multiplexed by the tristate (TR) flip-flops 9181 to 9193 to a single signal string, so that the time-division signal components are respectively supplied to the corresponding vertical optimal block detectors 915 to 927. The 7-sample delay circuit 9194 delays the signal of the prediction error accumulator and the serial-parallel converter by a 7-sample period. The delayed signal is supplied to the prediction error accumulator.

FIG. 10 shows a timing chart of the prediction error accumulators 902 and 903. After 49 time slots, 13 prediction error accumulation data g are obtained. These data are converted to time-serial data h of 13 time slots which are respectively supplied to the vertical optimal detectors.

There are provided 13 vertical optimal block detectors (VBD) 915 to 927. Each VBD receives data of blocks corresponding to 13 vertical displacements (±6 lines) and given horizontal displacements.

Figure 11:
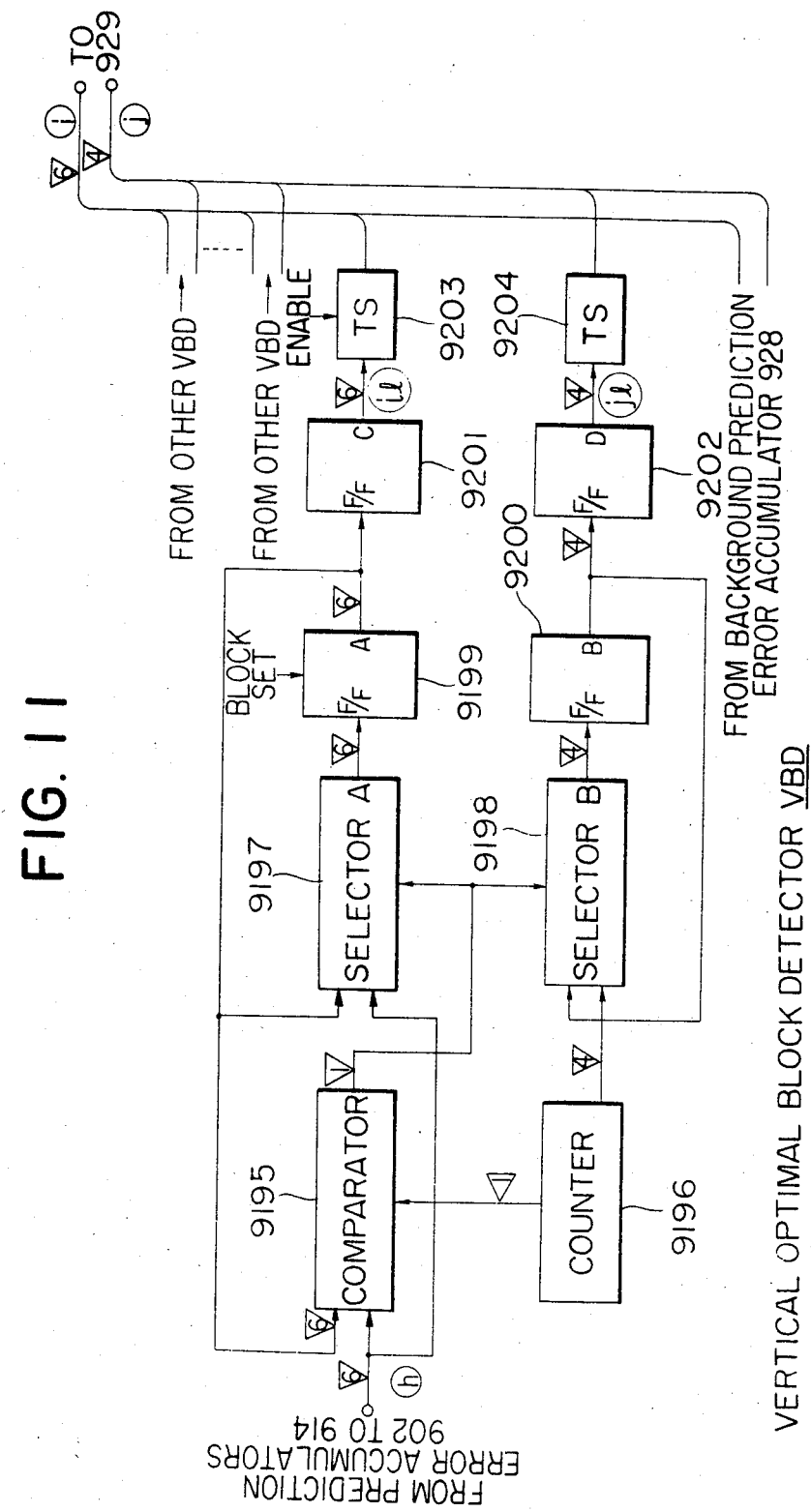
FIG. 11 is a block diagram showing the detailed arrangement of a vertical optimal block detector (VBD) shown in FIG. 5.

FIG. 11 shows the detailed arrangement of one of the vertical optimal block detectors (VBD). In each vertical optimal block detector, reference numeral 9195 denotes a comparator; 9196, a counter; 9197 and 9198, selectors, respectively; 9199 to 9202, flip-flops, respectively; and 9203 and 9204, tristate flip-flops, respectively. The comparator 9195 compares the output of the prediction error accumulator with the output of the flip-flop 9199 for every time slot. The comparison result is supplied to the selectors 9197 and 9198. The selector 9197 selects a smaller value of the inputs in accordance with a comparison output from the comparator 9195. The flip-flop 9199 generates a possible maximum value at the beginning of the block and then stores the output generated from the selector 9197. Therefore, the output from the flip-flop 9199 becomes minimum data among the input signals supplied from the prediction error accumulator when 13 time slots have elapsed. The flip-flop 9201 stores the output generated from the flip-flop 9199 for every block. The tristate flip-flop 9203 is wired-OR connected to tristate flip-flops in the other vertical optimal block detectors. The outputs from the tristate flip-flops 9203 and 9204 are time-division multiplexed as a single signal string which is supplied to the horizontal optimal block detector 929.

The counter 9196 generates data which represents time slot number in the block. The output from the counter 9196 is generated through the selector 9198, the flip-flops 9200 and 9202, and the tristate flip-flop 9204. The counter output is selected as the address data finally selected by the selector 9197 and is supplied to the horizontal optimal block detector 929. In this case, the counter 9196 controls the comparator 9195 so as to select a sample near the center of the motion compensation range of ±6 vertical and horizontal samples when the inputs to the comparator 9195 are equal.

FIG. 12 shows input and output signal strings with respect to the vertical optimal block detector shown in FIG. 11.

The background prediction error accumulation data is calculated by the background prediction error accumulator 928. This circuit is constituted by the components surrounded by a broken line in FIG. 9. The operation of the background prediction error accumulator is the same as described with reference to FIG. 9.

A minimum output must be selected from (a total of 14 outputs) outputs from the 13 vertical optimal block detectors and one output from the background prediction error accumulator. For this purpose, 14 data are converted to time-serial data of 14 time slots, and the resultant data is supplied to the horizontal optimal block detector 929.

Figure 13:
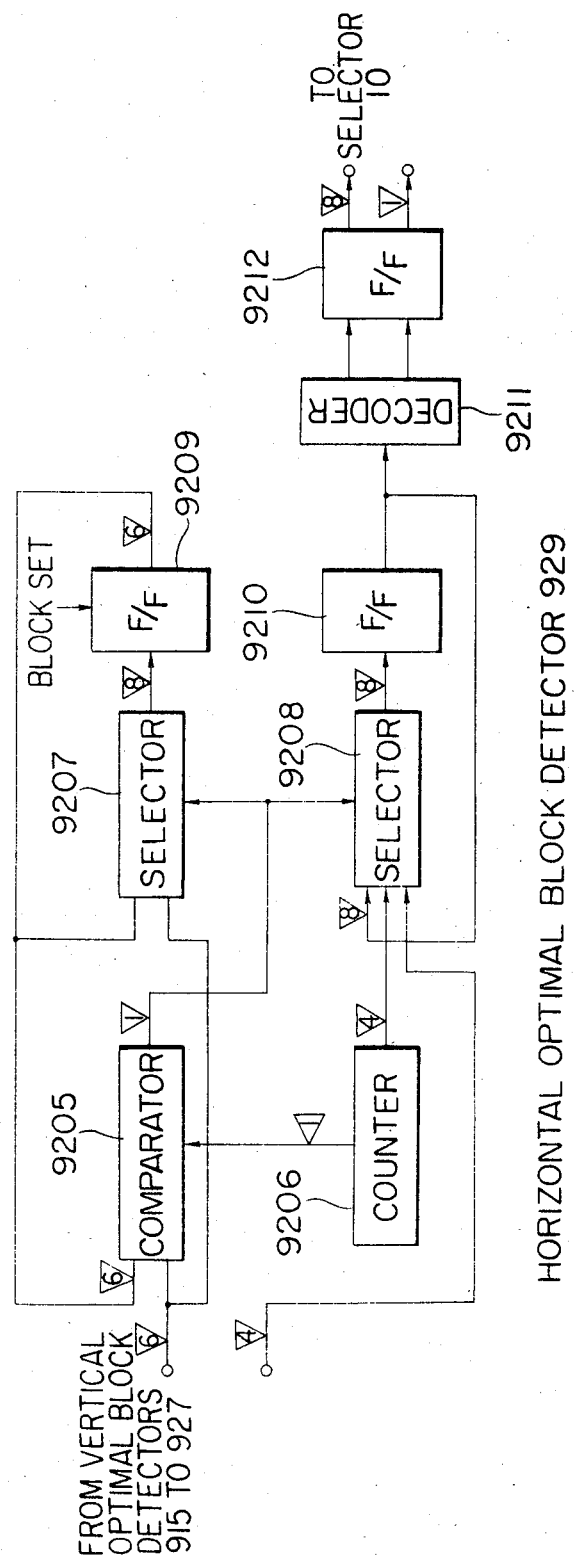
FIG. 13 is a block diagram showing the detailed arrangement of a horizontal optimal block detector shown in FIG. 5.

FIG. 13 shows the detailed arrangement of the horizontal optimal block detector 929. In FIG. 13, reference numeral 9205 denotes a comparator; 9206, a counter; 9207 and 9208, selectors, respectively; 9209, 9210 and 9212, flip-flops, respectively; and 9211, a decoder. The horizontal optimal block detector 929 is operated in the same manner as the vertical optimal block detector (FIG. 11), so that only one optimal block is detected. In this case, the selector 9208 selects one of the data supplied from the tristate flip-flops (9204, etc.) in synchronism with the operation of selecting the output generated from the counter 9206 and the flip-flop 9210. As a result, the flip-flop 9210 generates data which indicates the optimal predictive block in the vertical and horizontal directions. The decoder 9211 decodes the optimal predictive block data and assigns codes (shown in the following table) corresponding to vertical and horizontal displacements. The flip-flop 9212 stores the outputs (e.g., moving block and background block) generated from the decoder 9211 in units of blocks and supplies these blocks to the selector 10 and the code assignment circuit 13.

The position signal corresponding to the detected optimal block is properly delayed by the selector 10 and is supplied as a prediction signal to the subtracter 11 and the adder 23.

TABLE

| Displacement | Optimal predictive block data |
|---|---|
| +6 | 0110 |
| +5 | 0101 |
| +4 | 0100 |
| +3 | 0011 |
| +2 | 0010 |
| +1 | 0001 |
| 0 | 0000 |
| −1 | 1111 |
| −2 | 1110 |
| −3 | 1101 |
| −4 | 1100 |
| −5 | 1011 |
| −6 | 1010 |

Figure 14:
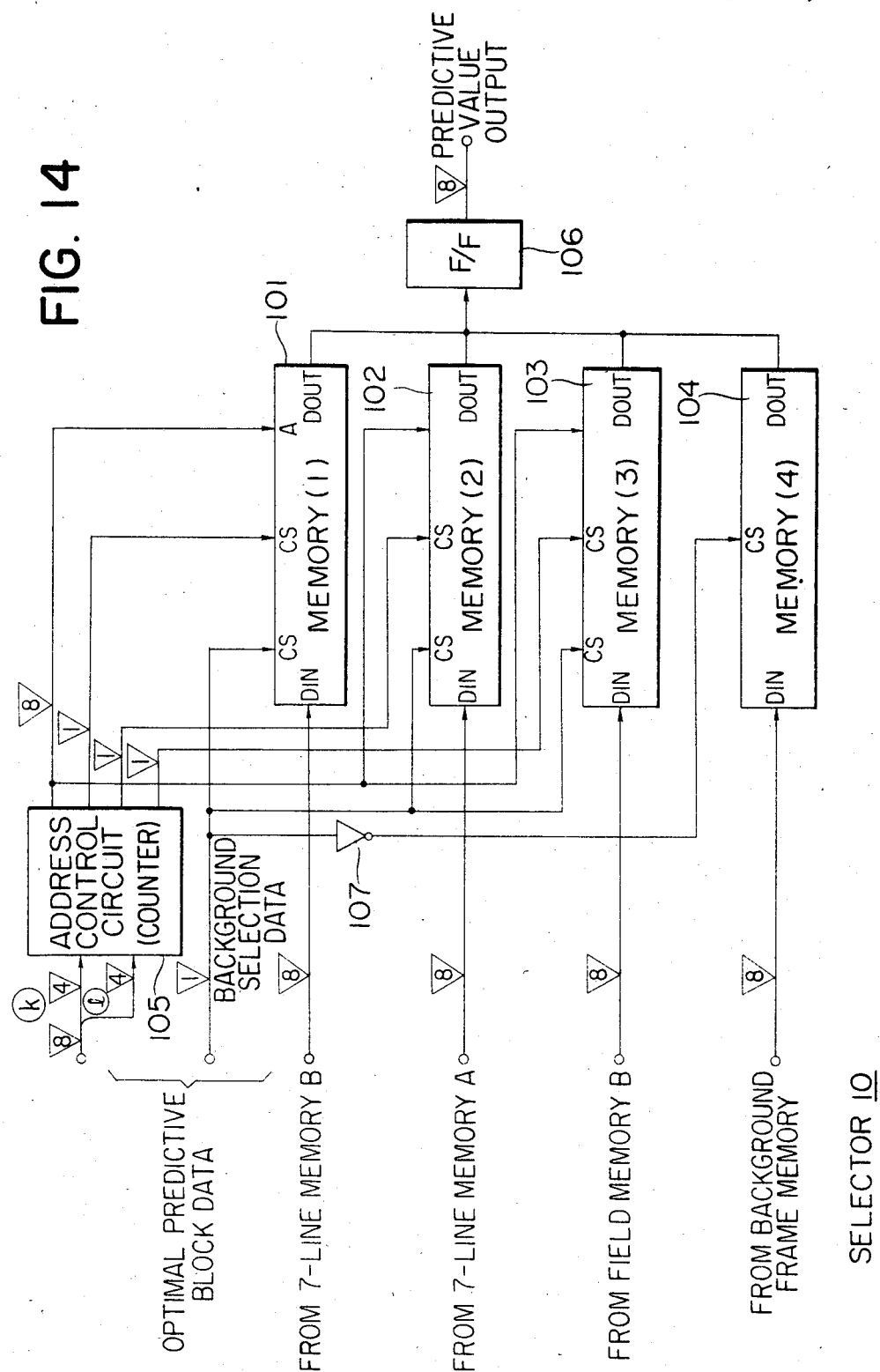
FIG. 14 is a block diagram showing the detailed arrangement of a selector shown in FIG. 1.

FIG. 14 shows the detailed arrangement of the selector 10. In this circuit, reference numerals 101 to 104 denote memories, respectively; 105, an address control circuit; 106, a flip-flop; and 107, an inverter. The memory 101 stores the first ⅓ of the data shown in FIG. 7B, the memory 102 stores the second ⅓ thereof, and the memory 103 stores the third ⅓ thereof. The memory 104 stores the background data (output from the second memory 8). Data are read out from the memories 101 to 103 under the control of the address control circuit 105. The data stored in the memory 104 are sequentially read out after they are delayed by a predetermined interval.

Figure 15:
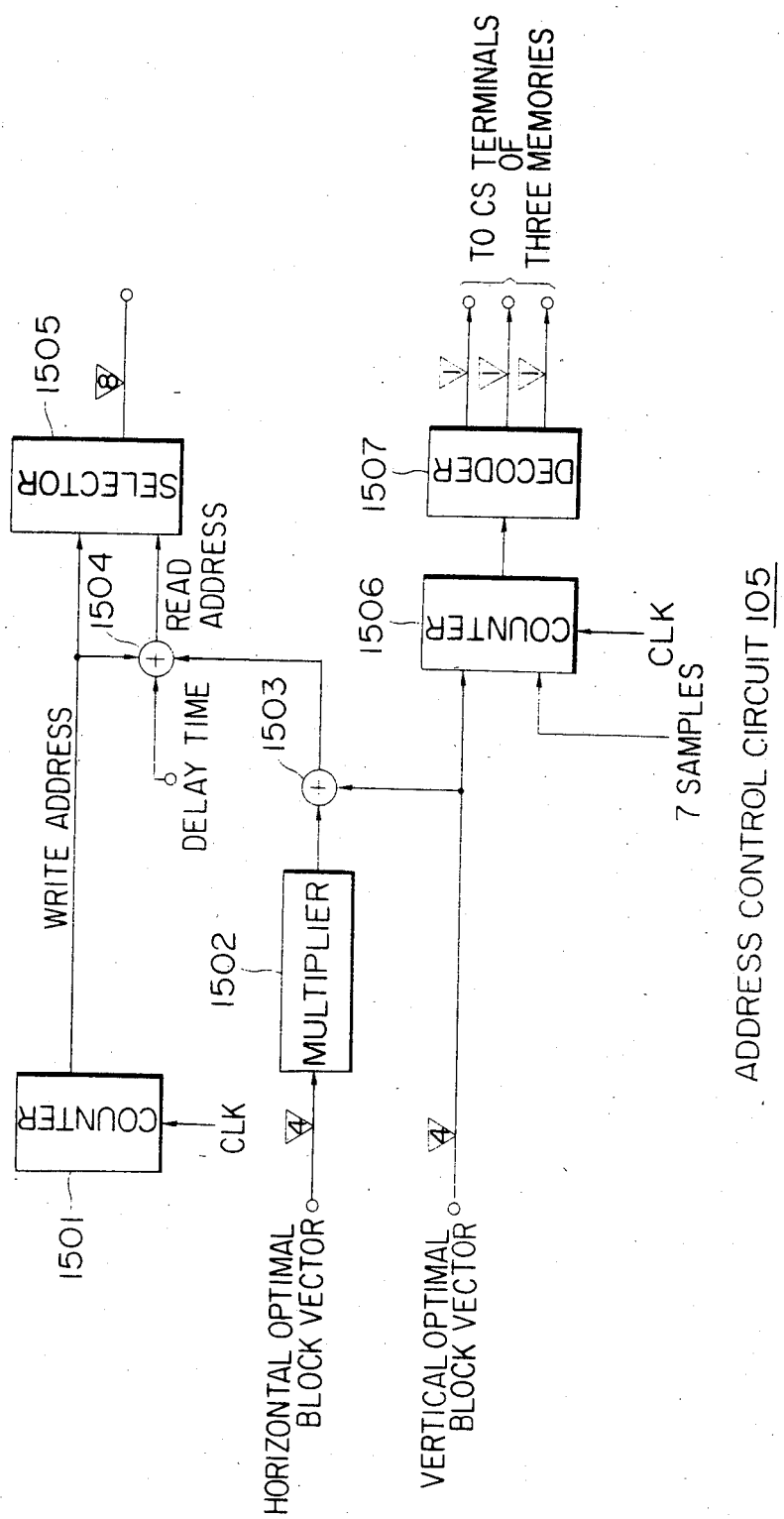
FIG. 15 is a block diagram showing the detailed arrangement of an address control circuit shown in FIG. 14.

FIG. 15 shows the detailed arrangement of the read-/write address control circuit 105. Reference numerals 1501 and 1506 denote counters; 1502, a multiplier; 1503 and 1504, adders, respectively; 1505, a selector; and 1507, a decoder. Data are stored in the memories 101 to 104 by using as an address signal the count of the counter 1501 for counting up the sampling clocks $f_S$.

The read address signals are controlled such that pel data corresponding to the optimal predictive block are sequentially read out. In particular, the row address of the optimal block is multiplied by 7 by means of the multiplier 1502. The multiplied address is added to the column address. The delay time and the write address are added to the sum of the multiplied address and the column address delayed, and the resultant data is used as the read address signal. The delay time is required to detect the optimal block by means of the optimal predictive block detector 9 and is determined by each circuit design. The specifications of the components of the circuit determine the delay time. The selector 1505 alternately supplies the outputs generated from the counter 1501 and the adder 1504 to the respective memories.

The counter 1506 counts the start line (vertical optimal block vector) of the optimal block. The count of the counter 1506 allows selection of one of the three memories 101 to 103 which is subjected to the read operation. The memories 101 to 104 are respectively controlled by corresponding chip select terminals CS. The outputs read out from the memories 101 to 104 are supplied to the flip-flop 106 since they are wired-OR connected to the flip-flop 106. The readout data are wave-shaped by the flip-flop 106 and are supplied as predictive values or estimates to the subtracter 11 and the adder 23.

A prediction error generated from the subtracter 11 is quantized by the prediction error processor 12 into a representative 15-level value in accordance with predetermined quantization characteristics.

In the above description, the case has been described wherein the prediction error processor 12 comprises a quantizer. However, the prediction error processor 12 may include a suppression circuit of the frame difference and an expander.

Figure 16:
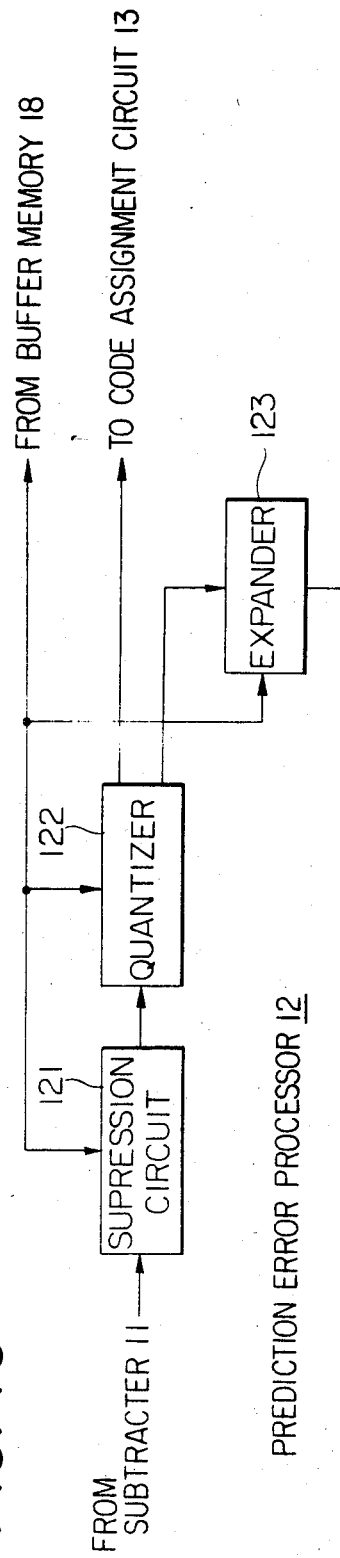
FIGS. 16 and 17 are block diagrams respectively showing different arrangements of a prediction error processor shown in FIG. 1.

FIG. 16 shows the detailed arrangement of the prediction error processor 12. Reference numeral 121 denotes a suppression circuit; 122, a quantizer; and 123, an expander. The prediction error supplied from the subtracter 11 is suppressed by the suppression circuit 121 in accordance with predetermined nonlinear characteristics. In this case, several types of nonlinear characteristics are prepared and are controlled in accordance with the memory capacity of the buffer memory 18. When the memory capacity of the buffer memory 18 is larger, the prediction error is suppressed at a higher rate. In this case, the characteristics can be discriminated in accordance with the color signals and the luminance signal. The suppressed data is quantized by the quantizer 122 in accordance with predetermined quantization characteristics. It is possible to change the characteristics in accordance with the memory capacity of the buffer memory 18. The quantized data are supplied to the code assignment circuit 13. At the same time, this data are expanded by the expander 123 in accordance with the inverse characteristics. The suppression circuit 121, the quantizer 122 and the expander 123 can be constituted by a ROM.

The quantizer 122 may be replaced with a previous value DPCM circuit. In this case, this DPCM processing is performed for an interframe difference and intraframe data, thereby performing an interframe composite prediction.

Figure 17:
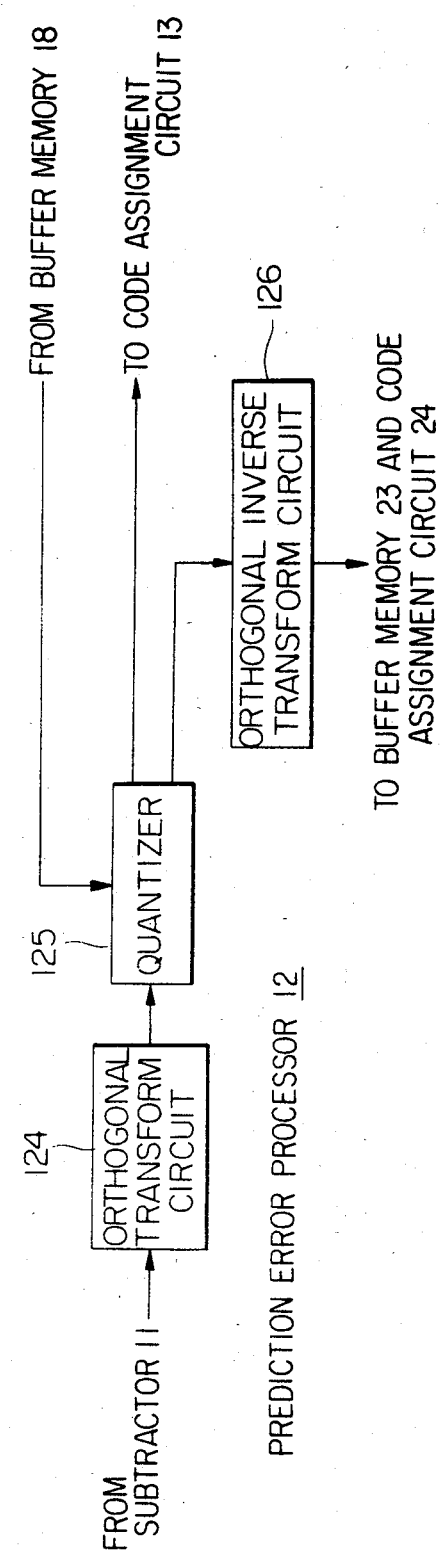

The prediction error processor 12 may comprise an orthogonal transform/encoding circuit. FIG. 17 shows the detailed arrangement of the orthogonal transform-/encoding circuit as the prediction error processor 12. Reference numeral 124 denotes an orthogonal transform circuit; 125, a quantizer; and 126, an orthogonal inverse transform circuit. The orthogonal transform circuit 124 can perform an Hadamard transform or cosine transform. Assume that the orthogonal transform circuit 124 performs an Hadamard transform. Data supplied to the subtracter 11 are grouped by the orthogonal transform circuit 124 into blocks in units of n samples. The circuit 124 then establishes correspondence between the blocks and corresponding vectors $X=(x1, x2, \ldots, xn)^t$ and transforms the blocks in accordance with an orthogonal matrix A and $Y=AX$. The transformed data are then quantized by the quantizer 125. The quantization characteristics can be changed in accordance with the amount of data produced from the orthogonal transform circuit 124 and the memory capacity of the buffer memory 18. The orthogonal inverse transform circuit 126 inverse-transforms the quantized data in accordance with $X=A^TY$, and the inverse transformed data are generated therefrom.

The code assignment circuit 13 will be described.

Figure 18:
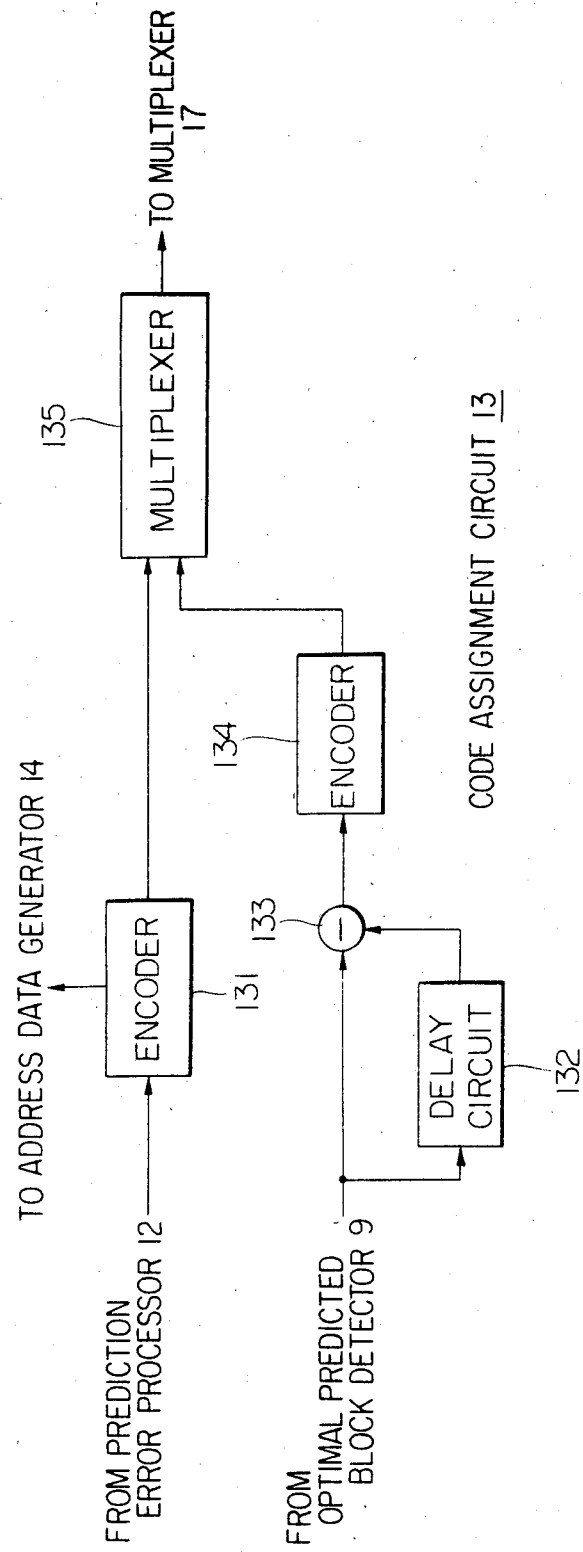
FIG. 18 is a block diagram showing the detailed arrangement of a code assignment circuit shown in FIG. 1.

FIG. 18 shows the detailed arrangement of the code assignment circuit 13. Referring to FIG. 18, reference numerals 131 and 134 denote encoders; 132, a delay circuit; 133, a subtracter; and 135, a multiplexer. The data supplied from the prediction error processor 12 are grouped into blocks in units of 49 samples. When the values of all samples in each block are zero, this block is detected as an invalid block, thereby inhibiting generation of an output. Other blocks are detected as effective blocks, respectively. Variable-length codes are assigned to the data of the respective samples. The code assignment circuit 13 supplies to the address data generator 14 data which represents the type of block. The address data generator 14 generates bit data "1" for the invalid block and bit data "0" for the effective block. This bit data is added to the MSB of the block, and the resultant data is time-division multiplexed by the multiplexer 17.

The data are grouped into blocks which are then transmitted, as described above. However, a run-length scheme can be used wherein consecutive "0" bit data are coded and transmitted, and other "1" bit data are transmitted by coding their addresses. In this case, the address data are also supplied from the address data generator 14 to the multiplexer 17.

The motion vector data supplied from the optimal predictive block detector 9 are delayed by a predetermined time by means of the delay circuit 132. The delayed data is subtracted by the subtracter 133 from the present-frame signal. A difference between the delayed data and the present-frame signal is assigned by the encoder 134 with a predetermined variable-length code. The multiplexer 135 time-division multiplexes the outputs generated from the encoders 131 and 134. The multiplexed data are supplied to the multiplexer 17. The delay time in the delay circuit 132 can be a one-block period, a one-field period or a one-frame period. The delay circuit 132 is reset at the beginning of, for example, a line.

The motion vector data are transmitted in the form of a difference in the above description. However, the motion vector data can be coded and transmitted without being processed in the form of a difference.

Referring again to FIG. 1, the multiplexer 17 multiplexes the outputs generated from the code assignment circuit 13, the address data generator 14, the error control data output circuit 15 and the code control data generator 16. The buffer memory 18 temporarily stores the data which are supplied at random and reads out the data in response to a predetermined clock supplied from the transmission clock generator 19. The transmission clock generator 19, the frame formatter 20 and the digital interface 21 comprise conventional circuits which are known to those skilled in the art.

The coding control data generator 16 detects the storage of the buffer memory 18 and determines the coding mode such as sub sampling for coding every other sample and interlaced field coding for coding every other field. The coding control data generator 16 supplies to necessary components control data which represents the coding mode.

The data generated from the prediction error processor 12 is added by the adder 23 to the output from the selector 10. The sum is supplied as a local decoded signal to the first memory 7 and the memory control circuit 25.

Figure 22:
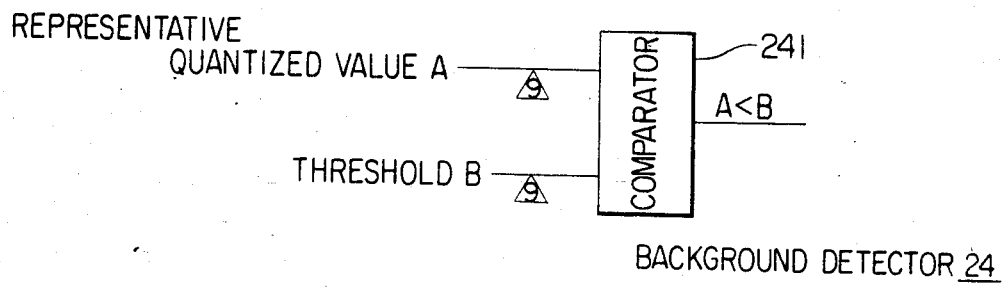
FIG. 22 is a block diagram showing a detailed arrangement of a background detector shown in FIG. 1.
Figure 23:
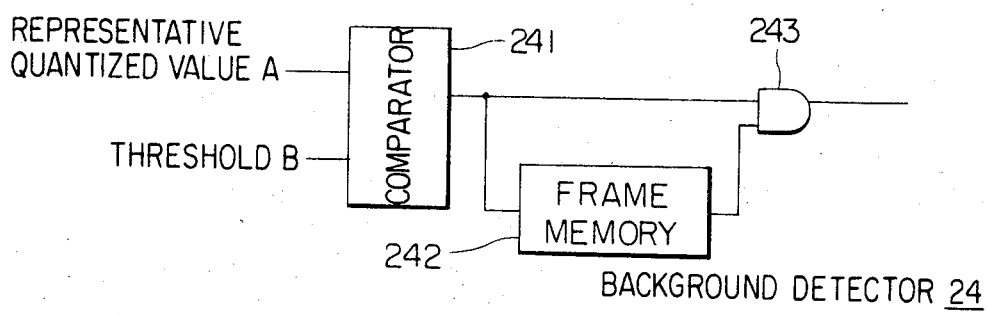
FIG. 23 is a block diagram showing another detailed arrangement of the background detector shown in FIG. 1, which determines a block to be a background area when the block is "1" for two consecutive frames.

The background detector 24 and the memory control circuit 25 which are the main feature of the present invention will be described. The background detector 24 receives the value (representative quantized value) supplied from the prediction error processor 12. When this value is smaller than a predetermined threshold value, the background detector 24 generates background data "1" which represents that the input data indicates a background area. The background data "1" is supplied to the memory control circuit 25. FIG. 22 shows a detailed arrangement of the background detector. Referring to FIG. 22, the representative quantized value A from the prediction error processor 12 and a predetermined threshold value B are compared by a comparator 241. When A<B, the comparator 241 generates a signal of logic "1". This arrangement exemplifies the case wherein the background detector 24 comprises only the threshold circuit. However, when outputs of the threshold circuit which correspond to data of a few frames (e.g., 6 frames) are consecutively set at logic "1", this frame period can be detected as a background data period, thereby generating background data. FIG. 23 shows a case wherein the background data is generated when a background detector 24 continuously detects a signal of logic "1" for a two-frame period. An output from the comparator 241 is stored in a frame memory 242 for a one-frame period. The data read out from the frame memory 242 and the output from the comparator 241 are logic-ANDed by an AND gate 243, thereby detecting the background area.

Figure 24:
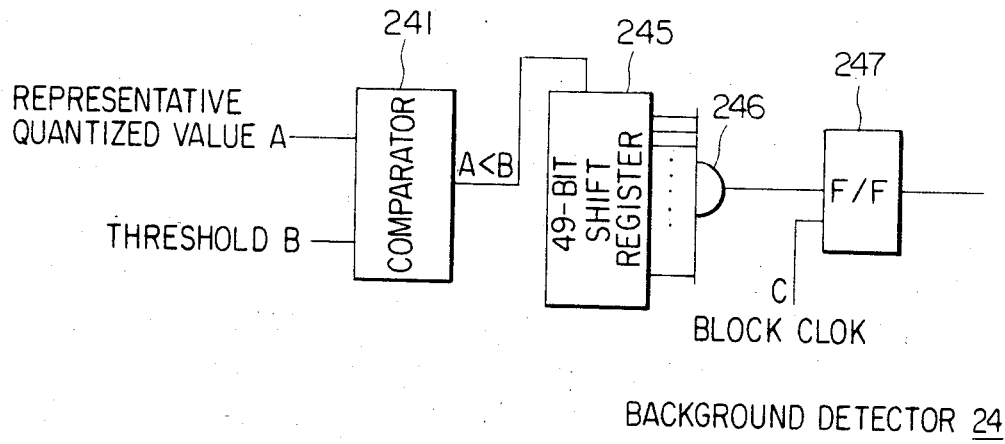
FIG. 24 is a block diagram showing still another detailed arrangement of the background detector shown in FIG. 1, which determins a block to be a background area when all the samples of the block are less than a predetermined threshold value.

In the above description, the background area is discriminated in units of samples. However, the background area can be detected in units of blocks each of which has an area of 7 lines×7 samples. In this case, when all the samples in a given block are smaller than a predetermined threshold value, the given block is regarded as the background area, as shown in FIG. 24.

Outputs from a comparator 241 are sequentially supplied to a 49-bit shift register 245. When the shift register 245 is full, all stored data are supplied to an AND gate 246 and are logic-ANDed, and an output from the AND gate 246 is set in a flip-flop 247 in response to a block clock C.

Figure 25:
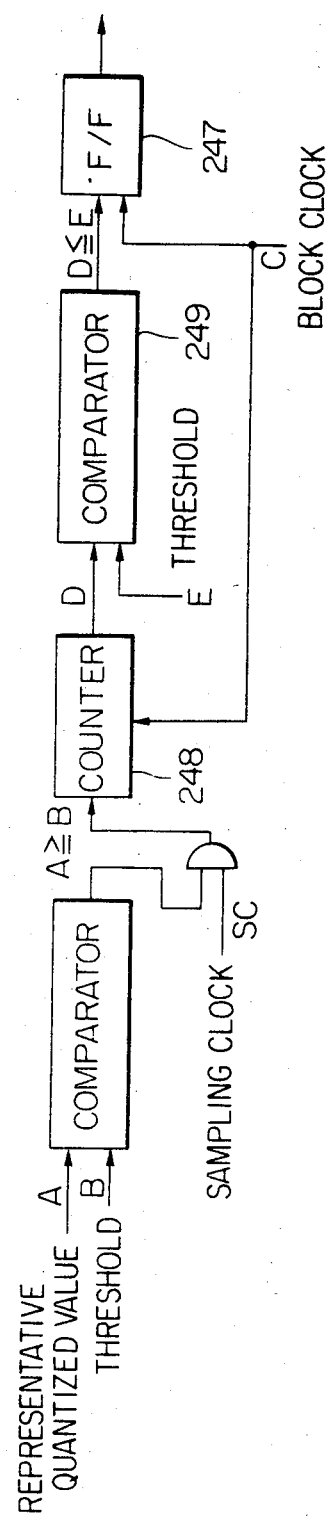
FIG. 25 is a block diagram showing still another detailed arrangement of the background detector shown in FIG. 1, which determins a block to be a background area when the number of samples in the block whose prediction errors are smaller than the predetermined threshold value is less than a predetermined value.

FIG. 25 shows still another detailed arrangement of the background detector 24. The samples which exceed the predetermined threshold value are counted by a counter 248. The count is compared with a predetermined value E by a comparator 249. When the count is smaller than the predetermined value E, the corresponding block is detected as the background block.

Figure 26:
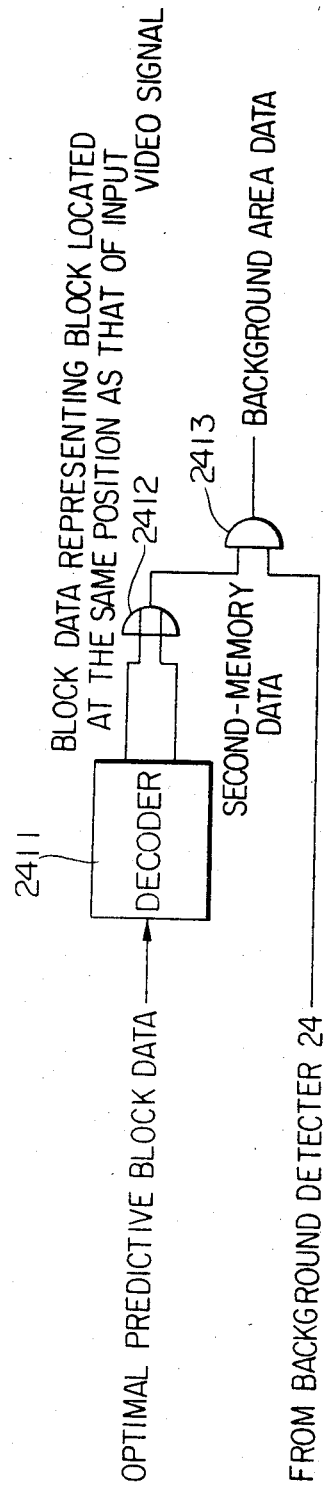
FIG. 26 is a block diagram showing still another detailed arrangement of the background detector shown in FIG. 1.

FIG. 26 shows still another detailed arrangement of the background detector 24 so as to improve background detection precision. The output from the background detector shown in any one of FIGS. 22 to 25 is corrected in accordance with data which represents the optimal predictive block. The optimal predictive block data is decoded by a decoder 2411. Only when the optimal predictive block is located in the same block of the present frame, or is the same as that stored in the second memory, the output from any one of the background detectors shown in FIGS. 22 to 25 is detected as the background data.

Figure 19:
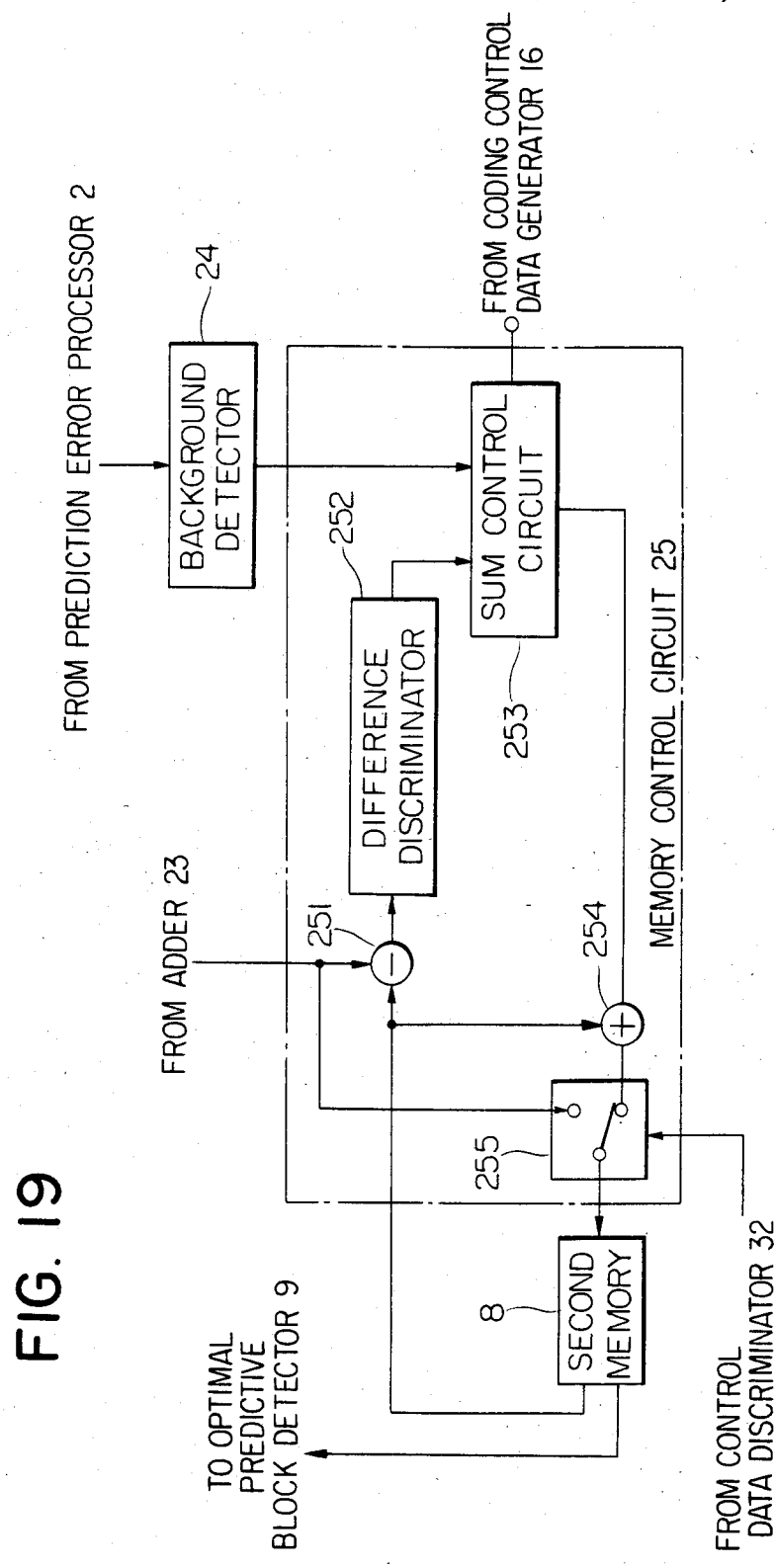
FIG. 19 is a block diagram showing the detailed arrangement of a memory control circuit shown in FIG. 1.

FIG. 19 shows the detailed arrangement of the memory control circuit 25. Referring to FIG. 19, reference numeral 251 denotes a subtracter; 252, a difference discriminator; 253, a sum control circuit; 254, an adder; and 255, a switch. The subtracter 251 subtracts the output of the second memory 8 from the local decoded value supplied from the adder 23. The difference discriminator 252 discriminates whether the output from the subtracter 251 is zero, positive or negative. The difference discriminator 251 is supplied discrimination data to the sum control circuit 253. When the output from the background detector 24 is set at logic "1", the sum control circuit 253 changes an output value in accordance with the output generated from the difference discriminator 252. The sum control circuit 253 generates a positive output +m (+m/256 V on the order of 8 bits), a negative output −m or a zero output 0 when the output from the difference discriminator 252 is positive, negative and zero, respectively. When the output from the background detector 24 is zero, the sum control circuit 253 generates a signal of logic "0". It should be noted that the value m is given to be, for example, 1. In addition, when the data supplied from the coding control data generator 16 represents the sub sampling mode, the sum control circuit 253 generates a signal of logic "0" during this video field period. Similarly, when the data supplied from the coding control data generator 16 represents the field interlaced decoding mode, the sum control circuit 253 generates a signal of logic "0" during the omitted field period.

In the above description, the sum control circuit 253 is operated in accordance with only the outputs from the background detector 24, the difference discriminator 252 and the coding control data generator 16. However, the sum control circuit 253 may be operated as follows.

Figure 20:
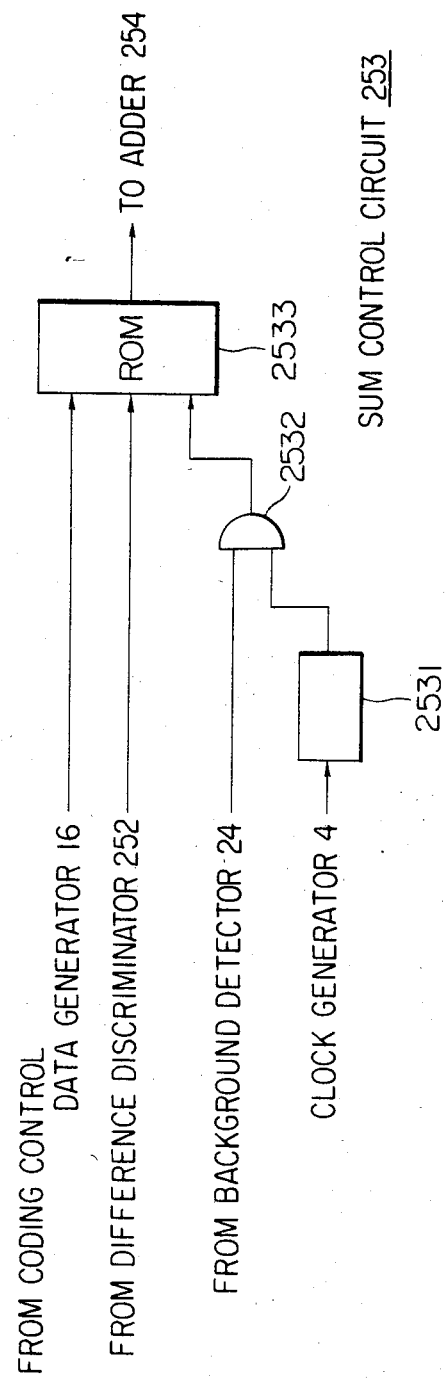
FIG. 20 is a block diagram showing the detailed arrangement of a sum control circuit shown in FIG. 19.

FIG. 20 shows another detailed arrangement of the sum control circuit 253. Referring to FIG. 20, reference numeral 2531 denotes a counter; 2532, an AND gate; and 2533, a ROM. The counter 2531 counts the frame pulses supplied from the clock generator 4 and generates a control enable signal (i.e., one-frame period signal "1") to enable sum control for every n frames (e.g., n is 6). However, when the signal from the counter 2531 is set at logic "0", the AND gate 2532 generates a signal of logic "0" even if the output from the background detector 24 is set at logic "1", so that the data of logic "0" is read out from the ROM 2533. The ROM 2533 has the same function as that of the sum control circuit described with reference to FIG. 19.

An output from the sum control circuit 253 is added by the adder 254 to the output read out from the second memory 8. The resultant data is supplied to the second memory 8 through the switch 255. The time constant for correcting the content of the second memory 8 is determined by values m and n as previously described.

The above description is associated with the case wherein the second memory 8 comprises a memory having a one-frame memory capacity. In this case, the content of the second memory 8 is corrected by a relatively short time constant. Therefore, when a person as an object to be photographed stops, the person is also detected as the background, so that this picture data is stored in the second memory 8. As a result, the background area is monitored on the screen after the person moves. However, proper background data are not stored in the second memory 8, so highly precise prediction cannot be performed.

In order to solve the drawback described above, a plurality (e.g., two) of background memories can be arranged. For example, one memory allows correction control for every 6 frames (n=6), and the other memory retains the background data written at the time of system initialization under the assumption that n=∞.

The switch 255 in FIG. 19 is used for transmission line error prevention and system initialization. The switch 255 will be described together with the error control data output circuit 15.

The error control data output circuit 15 receives parity data of storage in the first memory 7 and supplies it to the receiving section through the multiplexer 17. This parity data is received at the receiving section of the receiving-side communication system and is identified with the parity data of the storage in the memory. At the time of system energization, the storage data at the receiving side differs from that at the sending side, so the parity data of the receiving and sending sides are not identified. The receiving side sends a demand refresh to the sending side. This demand refresh data is sent from the sending section of the receiving-side system and is received by the receiving section of sending-side system or apparatus shown in FIG. 1. The demand refresh data is discriminated by the control data discriminator 32 in FIG. 1. The discriminated data is supplied to the first memory 7, the error control data output circuit 15 and the memory control circuit 15 in the sending section. When the first memory 7 receives the demand refresh data, it performs predetermined interframe coding by setting the output to be a predetermined value (127/256 V) during a one-frame period after the start time of the next video frame. The error control data output circuit 15 generates data (i.e., memory set data) which indicates that the frame is set with the predetermined value. The data from the control data output circuit 15 is sent to the receiving section of the receiving-side system or apparatus through the multiplexer 17. When the receiving-side apparatus detects the memory set data, the output from the corresponding memory is set at 127/256 V during the subsequent one-frame period in the same manner as in the sending-side apparatus. As a result, after this one-frame period, the storage data at the sending side can be completely identified with that at the receiving side. Thereafter, the parity data identification can be properly performed unless transmission error occurs.

In order to prolong an interval of demand refresh data generation, it is possible to arrange an error coding/decoding circuit for the coded data to be transmitted.

In the above description, demand refresh data is generated for every frame. However, demand refresh can be performed in units of blocks.

In the above description, storage data is set during the one-frame period. An interframe coding method can be used wherein the data may be set during the first field period of the two fields constituting one frame, and the local decoded value for the first filed is used as the predictive value during the second field period.

The first memory 7 is set in the manner as described above. A method of setting the second memory 8 will be described. This setting operation is performed by the switch 255 shown in FIG. 19. The switch 255 is started from the video frame whose period is subjected to setting of the first memory 7 and is operated to connect data supplied from the adder 23 during a 30-frame period thereafter. Therefore, the parity data identification need not be performed between the second memories of the sending and receiving sides.

In the above description, the demand refresh scheme is used to prevent a transmission error. However, another method may be used. The storage data in the first and second memories 7 and 8 are periodically transmitted for each one line per frame so as to forcibly identify the content of the memories of the receiving side with that of the sending side. Alternatively, only the storage data in the first memory 7 are periodically transmitted as described above, while the second memory 8 is set by using the data stored in the first memory 7 for every predetermined period.

The above description is associated with the operation of the sending section. The constitution of the receiving section will be described with reference to FIG. 1. Referring to FIG. 1, the receiving section includes: the buffer memory 30 for temporarily storing the received data in response to the transmission clock and reading out the stored data at a decoding rate; the control data discriminator 32 for discriminating various control data from the outputs generated from the buffer memory 30; the address data discriminator 31 for discriminating address data; the word discriminator 33 for discriminating a word which represents the optimal predictive block and a word which represents the representative quantized value; the prediction error decoder 34 for receiving the output from the word discriminator 33 and decoding the prediction error; the third memory 35 for storing decoded picture data; the fourth memory 36 for storing the background data; the selector 37 for receiving the outputs read out from the third and fourth memories and for generating a signal for a block specified by the optimal predictive block data as the output generated from the word discriminator 33; the adder 38 for adding the outputs generated from the selector 37 and the prediction error decoder 34; the background detector 39 for receiving an output from the prediction error decoder 34 and detecting a background area in a picture; the memory control circuit 40 for receiving the outputs read out from the adder 38 and the fourth memory 36 and for correcting the content of the fourth memory 36 at an area as the background area specified by the output generated from the background detector 39; the postprocessor 41 for rearranging the data in response to the output generated from the adder 38; and the D/A converter 42 for converting to an analog signal the digital signal as the output generated from the postprocessor 41. The respective components in the receiving section have inverse functions to the corresponding components in the sending section.

In the receiving section, the data is demodulated by the prediction error demodulator 34 and is processed by the postprocessor 41.

Figure 21:
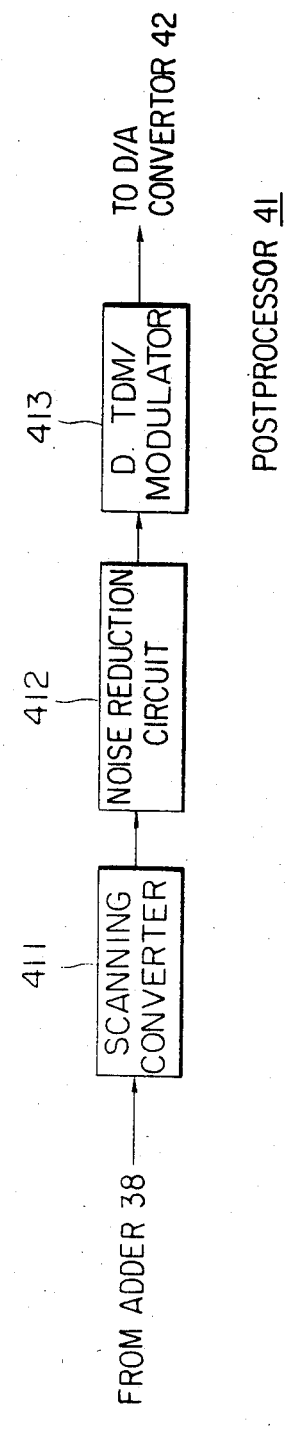
FIG. 21 is a block diagram showing the detailed arrangement of a postprocessor shown in FIG. 1.

FIG. 21 is the detailed arrangement of the postprocessor 41. Referring to FIG. 21, reference numeral 411 denotes a scanning converter; 412, a noise reduction circuit; and 413, a DTDM/modulator. The scanning converter 411 has the inverse function to the scanning converter 603 at the sending side. The noise reduction circuit 412 can comprise a conventional noise reducer which reduces a block-shaped noise component generated by motion compensated coding. The DTDM/modulator 413 separates the luminance signal Y and the color signals C1 and C2 which are time-division multiplexed. The color signals C1 and C2 are expanded along the time base and converted to the NTSC or PAL signal having the same format as the input signal. An output from the DTDM/modulator 413 is converted by the D/A converter 42 from the digital signal to the analog signal. The analog signal is then supplied to the low-pass filter 43, so that the band-limited video signal appears at the video output terminal 44.

In the above description, background discriminating coding as the main feature of the present invention is applied to a motion compensated interframe encoder. The present invention can also be applied to an interframe coding without motion compensation to achieve a higher coding efficiency. In the above description, the block of the present frame (input video signal) is compared with the block located in the same position as that of present frame and its neighboring blocks in the previous frame, data of the same and neighboring blocks being stored in the first memory, so as to detect the optimal predictive block and hence performing motion compensation. However, the block of the present frame need not be compared with the neighboring blocks of the previous frame, thereby simplifying the configuration of the optimal predictive block detector.

Figure 27:
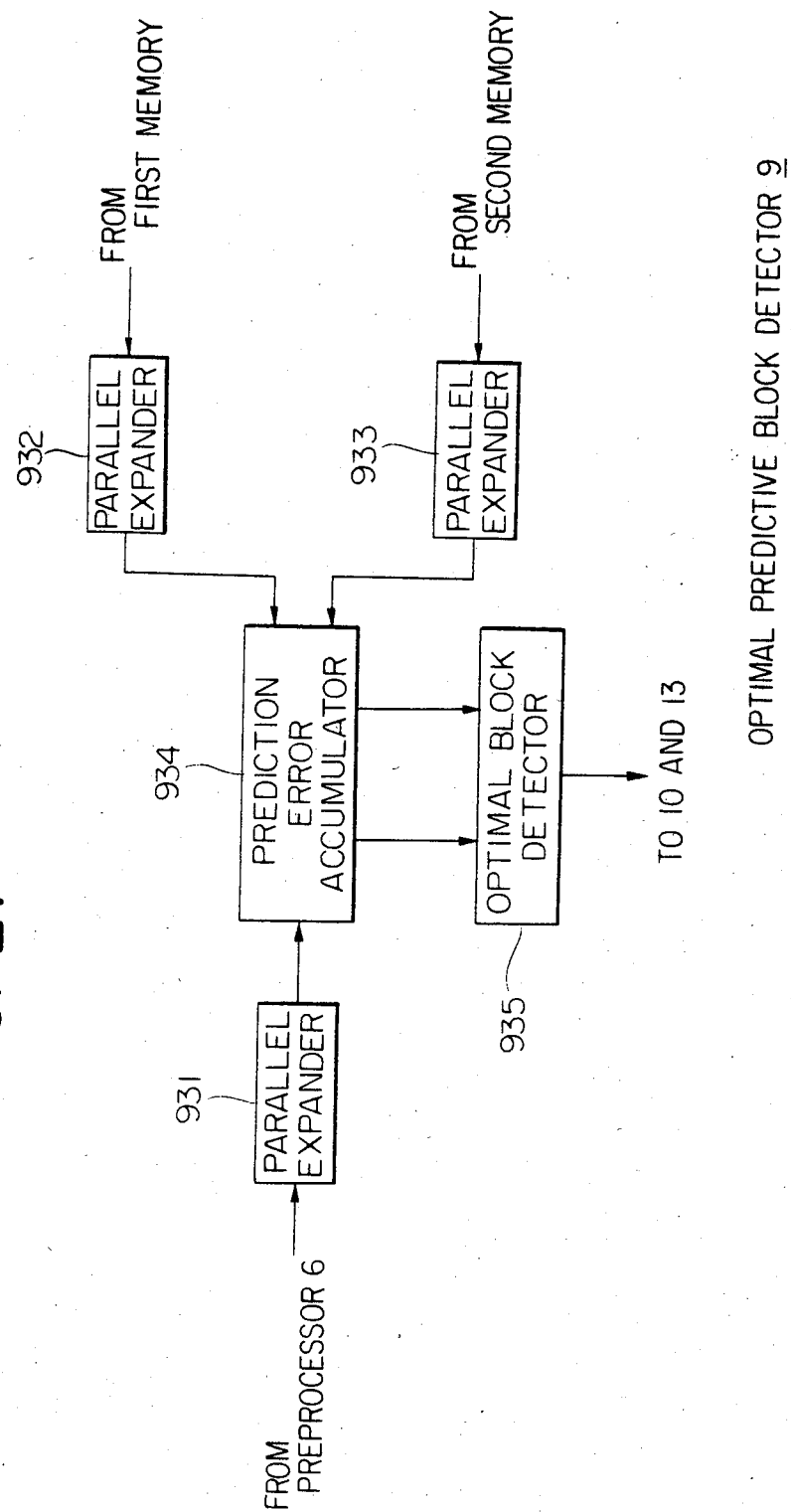
FIG. 27 is a block diagram showing another detailed arrangement of the optimal predictive block detector shown in FIG. 1.

FIG. 27 shows the simplified arrangement of the optimal predictive block detector. This detector comprises serial-parallel converters 931, 932 and 933, a prediction error accumulator 934 and optimal block detector 935. The signals supplied from the preprocessor 6, and the first and second memories 7 and 8 have the same format as shown in FIG. 5B. These signals are converted by the serial-parallel converters 931, 932 and 933 to seven sample parallel data $X_i^1, \ldots,$ and $X_i^7$. These serial-parallel converters can comprise shift registers which can generate parallel outputs. The outputs from the serial-parallel converters 931, 932 and 933 are supplied to the prediction error accumulator 934.

Figure 28:
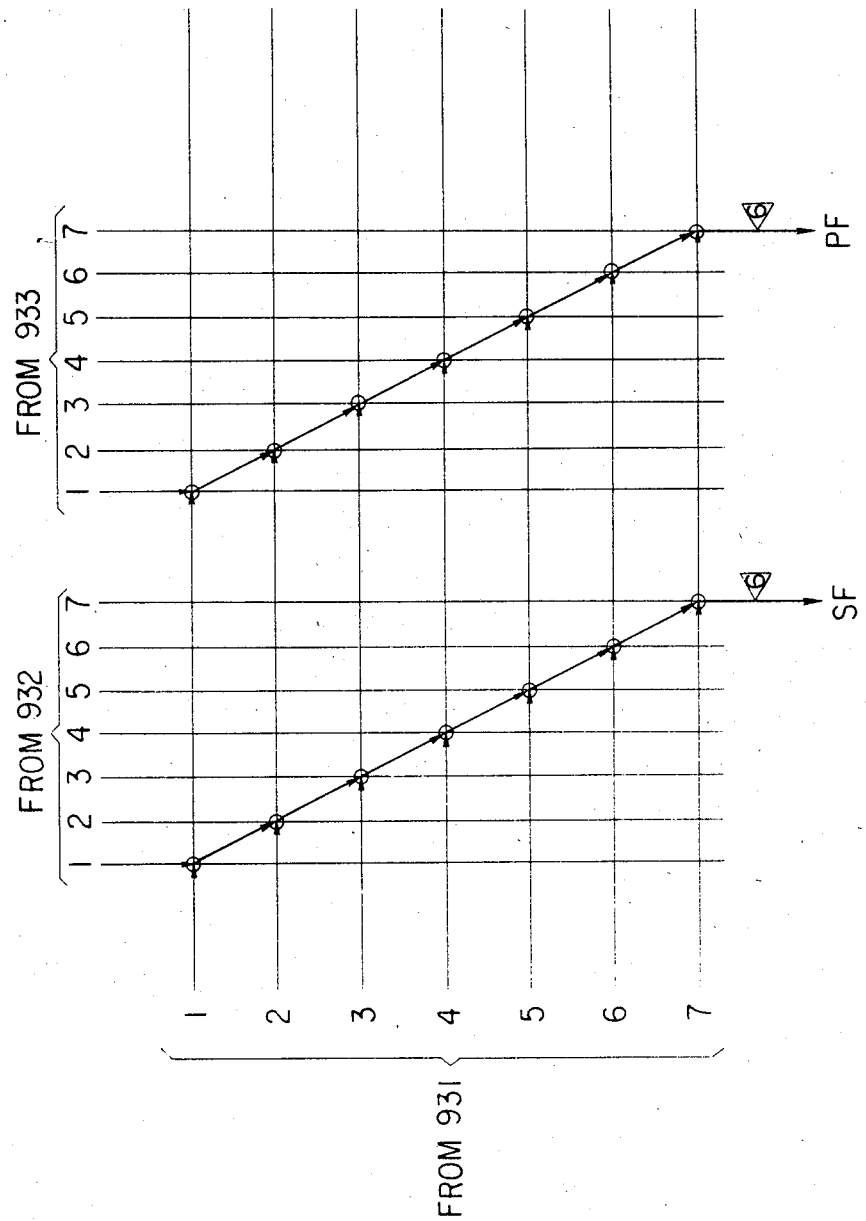
FIG. 28 is a representation for explaining the operation of the prediction error accumulator shown in FIG. 5.

FIG. 28 shows the representation for explaining the operation of the prediction error accumulator 934. The column numbers respectively indicate block line numbers of an output from the serial-parallel converter 931, and the row numbers indicate block line numbers of outputs from the serial-parallel converters 932 and 933. The prediction errors are calculated at seven intersections (each indicated by a circle) between every two pels. The prediction errors at the intersections are accumulated, as indicated by a thick line connecting the intersections.

Figure 29:
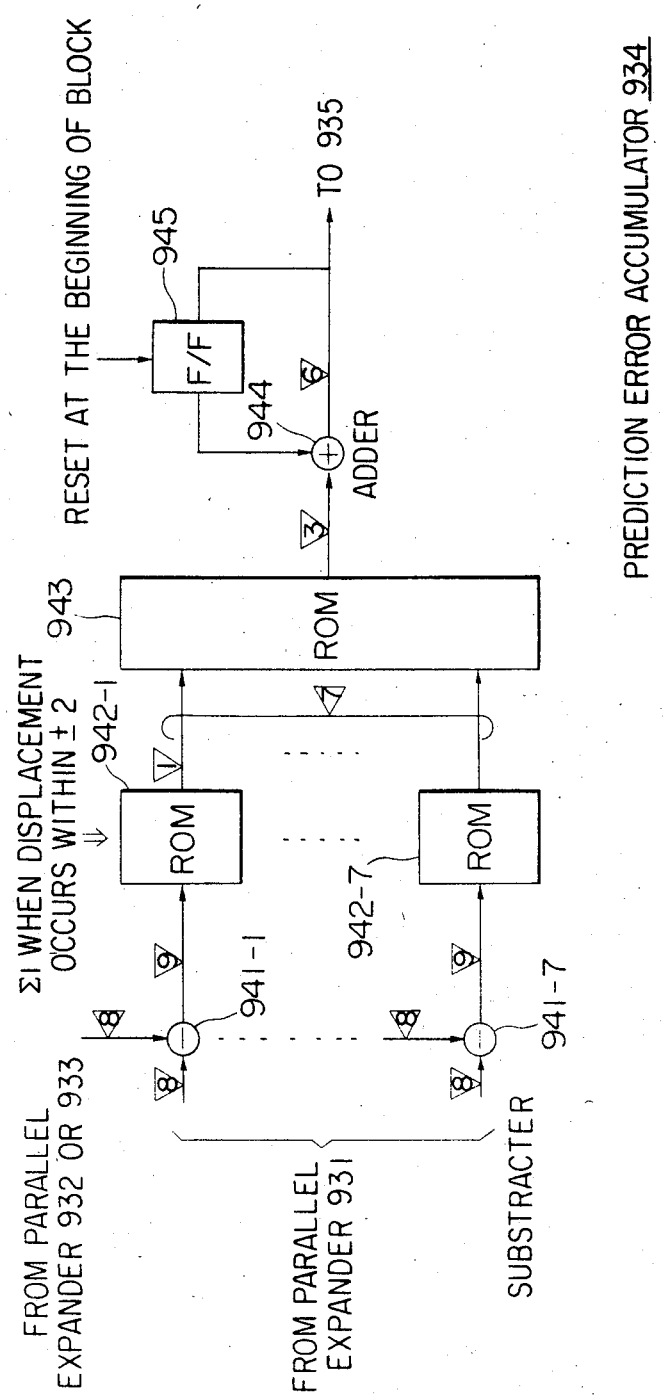
FIG. 29 is a block diagram showing another detailed arrangement of the prediction error accumulator shown in FIG. 5.

FIG. 29 shows an accumulator for accumulating the prediction errors at the seven intersections shown in FIG. 28. Referring to FIG. 29, reference numerals 941-1 to 941-7 are subtracters, respectively; 942-1 to 942-7, ROMs, respectively; 943, a ROM; 944, an adder; and 945, a flip-flop. It should be noted that a numeral in a triangle indicates the number of bits. Each of the subtracters 941-1 to 941-7 subtracts the output of the serial-parallel converter 932 or 933 from as a predictive value the output generated from the serial-parallel converter 931. The ROMs 942-1 to 942-7 respectively generate signals of logic "1" when the absolute values of the outputs from the subtracters 941-1 to 941-7 exceed a predetermined threshold value. Otherwise, the ROMs 942-1 to 942-7 generate signals of logic "0", respectively. The ROM 943 decodes the outputs read out from the ROMs 942-1 to 942-7. In particular, the ROM 943 decodes the bits of logic "1" among the seven bits, and the decoded value is expressed by a complementary number of 2. The complementary number data is generated from the ROM 943. The adder 944 and the flip-flop 945 constitute an accumulator. The flip-flop 945 is reset at the beginning of the block consisting of 49 samples (=7 lines×7 samples). Thereafter, the outputs from the flip-flop 945 are added by the adder 944. At the end of the block, outputs SF (background prediction error accumulated value) and PF (foreground prediction error accumulated value) which are generated from the adder 944 indicate the number of samples whose prediction errors are equal to or larger than the predetermined threshold value. The output SF is compared with the output PF, and a smaller one is detected as the optimal predictive block.

In the above description, the samples having prediction errors whose absolute values are larger than the predetermined threshold value are accumulated. However, the optimal predictive block may be detected by a smallest accumulated value of the accumulated values of the blocks by comparing these accumulated values. In this case, the ROMs 942-1 to 942-7 are replaced with absolute value circuits, and the ROM 943 is replaced with an adder, respectively.

According to still another method of detecting the optimal predictive block, mean square prediction errors are accumulated, and the accumulated values of the blocks are compared. In this case, the ROMs 942-1 to 942-7 are replaced with means square circuits, and the ROM 943 is replaced with an adder, respectively.

The outputs SF (background prediction error accumulated value) and PF (foreground prediction error accumulated value) are compared by the optimal block detector 935 so as to access the memory which has the smaller value by a circuit means. This circuit means comprises a comparator.

According to the present invention as described above, the second memory for storing the background data is arranged, so that the background areas can be monitored with high precision after a moving object is displaced. Therefore, high-efficient coding, and a high-quality image can be obtained when a bit rate is preset.

What is claimed is:

1. An interframe coding method for performing predictive coding by dividing an input video signal into blocks each of which has a predetermined size, which comprises: storing background data in second memory means arranged in addition to first memory means for storing coded picture data; detecting, as an optimal predictive block for every block of the input video signal, a block having a minimum number of prediction errors from the blocks read out from said first and second memory means is detected; and performing predictive coding by using the optimal predictive block.

2. A method according to claim 1, wherein the block read out from each of said first and second memory means and compared with the input video signal so as to detect the optimal predictive block comprises a block in a picture which is located at the same position of a corresponding block of the input video signal.

3. A method according to claim 1, wherein the blocks read out from said first memory means and compared with the input video signal so as to detect the optimal predictive block comprises a given block in a picture which is located at the same position as that of a corresponding block of the input video signal and neighboring blocks of the given block, and the block read out from said second memory and compared with the input video signal so as to detect the optimal predictive block comprises a block in a picture which is located at the same position as that of the input video signal.

4. A method according to claim 1, comprising detecting whether the prediction error of each sample of each of the blocks of the input video signal is smaller than a predetermined threshold value, and the sample is detected as a background area when the prediction error is smaller than the predetermined threshold value.

5. A method according to claim 1, comprising detecting whether the prediction error of each sample of each of the blocks of the input video signal is smaller than a predetermined threshold value, and the block is detected as a background area when the prediction errors of all the samples of the block are smaller than the predetermined threshold value.

6. A method according to claim 1, comprising detecting whether the prediction error of each sample of each of the blocks of the input video signal is smaller than a predetermined threshold value, and the block is detected as a background area when the number of samples having the prediction errors is not less than a predetermined number.

7. A method according to claim 1, comprising detecting whether the prediction error of each sample of each of the blocks of the input video signal is smaller than a predetermined threshold value for a period of a plurality of frames, and the sample or block is detected as a background area when the prediction errors of all the samples of the block are smaller than the predetermined threshold value for the period of the plurality of frames.

8. A method according to claim 1, wherein the background data stored in said second memory means are updated on the basis of the input video signal in accordance with detection of a background area.

9. A method according to claim 8, wherein the background data stored in said second memory means are periodically updated.

10. An interframe coding apparatus comprising:
preprocessing means for rearranging the input video signal into block signals and generating the block signals;
first memory means for storing coded picture data;
second memory means for storing background data;
optimal predictive block detecting means for receiving outputs read out from said first and second memory means and for detecting an optimal predictive block having a minimum prediction error for the block signal supplied from said preprocessing means;
selecting means for receiving the outputs read out from said first and second memory means and for selecting the block signal detected by said optimal predictive block detecting means;
means for generating a prediction error signal in accordance with outputs generated from said preprocessing means and said selecting means;
background detecting means for receiving the prediction error signal and detecting a background area in a picture; and
memory controlling means for correcting a content of said second memory which corresponds to the background region detected by said background detecting means.

11. An apparatus according to claim 10, wherein said optimal predictive block detecting means receives the outputs from said first and second memory means, rearranging the input video signal into block signals which respectively correspond to the blocks and defining the block signals as predictive values, and detects as the optimal predictive block a block having a minimum one of the prediction errors among the blocks read out from said first and second memory means.

12. An apparatus according to claim 10, wherein said optimal predictive block detecting means receives the outputs from said first and second memory means, calculates the prediction errors with respect to each block supplied from said preprocessor, by using as predictive blocks a given block in a picture which is located at the same position as that of a corresponding block of the input video signal and neighboring blocks of the given block, the given block and neighboring blocks being read out from said first memory mean, and a block in a picture which is located in the same position as that of the input video signal and which is read out from said second memory means, and detects as the optimal predictive block a minimum one of the prediction errors.

13. An apparatus according to claim 10, wherein said background detecting means receives the prediction error signal from said means for generating the prediction error signal, detects the background area when the prediction error signal is smaller than a predetermined threshold value, and generating background area data in units of samples.

14. An apparatus according to claim 10, wherein said background detecting means receives the prediction error signal from said means for generating the prediction error signal, detects the background area when the prediction errors of all samples within a block are smaller than a predetermined threshold, and generating background area data in units of blocks.

15. An apparatus according to claim 10, wherein said background detecting means receives the prediction error signal from said means for generating the prediction error signal, detects the background area when the number of samples of a block whose prediction errors is smaller than a predetermined threshold value is not less than a predetermined value, and generates background area data in units of blocks.

16. An apparatus according to claims 10 to 15, wherein said background detecting means generates the background area data when said background detecting means continuously detects given samples or blocks in pictures which are located at the same positions as those of corresponding samples or blocks of input video signals for a period of a plurality of frames.

17. An apparatus according to claims 10 to 15, wherein said background detecting means receives the prediction error signal supplied from said means for generating the prediction error signal, detects the background area when the prediction error signal is smaller than a predetermined threshold value for a period of a plurality of frames, and generates the background area data.

18. An apparatus according to claim 10, wherein said background detecting means receives the optimal predictive block data from said optimal predictive block detecting means and the prediction error signal from said means for generating the prediction error signal, detects the background area when the prediction error signal is smaller than the predetermined value and the optimal predictive block data represents a block located at the same position of a block read out from one of said first and second memory means, and generates the background area data.

19. An apparatus according to claim 10, wherein said memory controlling means includes a subtracter for subtracting the output of said second memory means from a local decoded value obtained by a sum of an output of said selecting means and the prediction error signal, and wherein a predetermined positive or negative value is stored in said second memory in accordance with the positive or negative output generated from said subtracter.

20. An apparatus according to claim 10, wherein said memory controlling means includes means for updating said second memory means at a predetermined interval.

21. An apparatus according to claim 10, wherein said second memory means includes a plurality of frame memories.

22. An interframe coding/decoding system comprising:
a sending section having
 a preprocessor for rearranging an input video signal into block signals and generating the block signals,
 a first memory for storing coded picture data,
 a second memory for storing background data,
 an optimal predictive block detector for receiving outputs read out from said first and second memories and for detecting an optimal predictive block having a minimum prediction error for the block signal supplied from said preprocessor,
 a first selector for receiving the outputs read out from said first and second memories and for selecting the block signal detected by said optimal predictive block detector,
 a circuit for generating a prediction error signal in accordance with outputs generated from said preprocessor and said first selector,
 a first background detector for receiving the prediction error signal and detecting a background area in a picture, and
 a first memory control circuit for correcting a content of said second memory which corresponds to the background region detected by said first background detector; and
a receiving section having a control data discriminator for discriminating various control data from received data,
 a word discriminator for discriminating a word which represents the optimal predictive block and a word which represents a representative quantized value,
 a prediction error decoder for decoding the prediction error in response to an output from said word discriminator,
 a third memory for storing the decoded picture data,
 a fourth memory for storing the background data,
 a second selector for receiving outputs from said third and four memories and generating a block signal specified by optimal predictive block data as an output from said word discriminator,
 an adder for adding outputs generated from said second selector and said prediction error decoder,
 a second background detector for receiving the output from said prediction error decoder and detecting a background area in a picture, and
 a second memory control circuit for receiving outputs from said adder and said fourth memory and updating a content of said fourth memory which corresponds to the background area specified by said second background detector.

* * * * *